(12) United States Patent
Rinzler et al.

(10) Patent No.: US 11,017,413 B2
(45) Date of Patent: *May 25, 2021

(54) SITUATIONAL AWARENESS AND SECURE DIRECT CONTACT INFORMATION DISCLOSURE SYSTEM

(71) Applicant: 1Q LLC, Sandy Springs, GA (US)

(72) Inventors: Keith Rinzler, Sandy Springs, GA (US); Ryan Cino, Decatur, GA (US); Brian Scully, Marietta, GA (US)

(73) Assignee: 1Q, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,050

(22) Filed: Jul. 17, 2019

(65) Prior Publication Data
US 2019/0362250 A1    Nov. 28, 2019

Related U.S. Application Data

(62) Division of application No. 16/195,129, filed on Nov. 19, 2018, now Pat. No. 10,387,786, which is a
(Continued)

(51) Int. Cl.
*H04W 4/029* (2018.01)
*G06Q 30/02* (2012.01)
*G06N 5/04* (2006.01)
(Continued)

(52) U.S. Cl.
CPC ....... *G06Q 30/0201* (2013.01); *G06F 16/951* (2019.01); *G06N 5/04* (2013.01); *G06N 7/005* (2013.01); *G06Q 20/29* (2013.01); *G06Q 30/0256* (2013.01); *G06Q 30/0277* (2013.01); *H04L 63/083* (2013.01); *H04L 63/0861* (2013.01); *H04L 63/101* (2013.01); *H04L 63/102* (2013.01); *H04L 63/107* (2013.01);
(Continued)

(58) Field of Classification Search
None
See application file for complete search history.

(56) References Cited

U.S. PATENT DOCUMENTS 6,757,661 B1    6/2004   Blaser et al.
7,493,267 B1    2/2009   Walker et al.
(Continued)

*Primary Examiner* — Brandon S Hoffman
(74) *Attorney, Agent, or Firm* — Mehrman Law Office; Michael J. Mehrman

(57) ABSTRACT

Security features a situational awareness system using location tracking information including requiring a security identifier, such as a password or a bio identifier, as a condition to providing situational awareness information. The system may also restrict situational awareness information to data pertaining to members that have creating a permission setting or responded to an "opt-in" prompt authorizing data from their profile to be included in the situational awareness information. Situational awareness information may also be denied to requesters identified as public offenders in a public offender database. Situational awareness information may also be restricted by access rules specified in a security rule base, such as rules related to enrollment and rules related to the age of the requester and the age of a demographic profile of interest identified in the situational awareness request.

20 Claims, 17 Drawing Sheets

Related U.S. Application Data division of application No. 15/852,729, filed on Dec. 22, 2017, now Pat. No. 10,140,579, which is a division of application No. 15/589,696, filed on May 8, 2017, now Pat. No. 9,894,077, which is a division of application No. 15/290,639, filed on Oct. 11, 2016.

(60) Provisional application No. 62/332,993, filed on May 6, 2016.

(51) Int. Cl.
| | |
|---|---|
| *G06F 16/951* | (2019.01) |
| *G06N 7/00* | (2006.01) |
| *G06Q 20/22* | (2012.01) |
| *H04W 12/084* | (2021.01) |
| *H04L 29/06* | (2006.01) |
| *H04W 4/02* | (2018.01) |

(52) U.S. Cl.
CPC ............ *H04W 4/02* (2013.01); *H04W 4/029* (2018.02); *H04W 12/084* (2021.01)

(56) References Cited

U.S. PATENT DOCUMENTS

| | | |
|---|---|---|
| 7,856,360 B2 | 12/2010 | Kramer et al. |
| 8,817,959 B1 | 8/2014 | O'Hanlon |
| 8,817,966 B2 | 8/2014 | Wrench |
| 9,202,026 B1* | 12/2015 | Reeves .................. G06F 21/33 |
| 9,299,027 B2 | 3/2016 | Smith et al. |
| 10,102,539 B2 | 10/2018 | Kramer et al. |
| 2007/0118603 A1 | 5/2007 | Washburn et al. |
| 2008/0172291 A1 | 7/2008 | Hurowitz et al. |
| 2008/0288271 A1 | 11/2008 | Faust |
| 2009/0264070 A1 | 10/2009 | Lim |
| 2011/0099046 A1 | 4/2011 | Weiss et al. |
| 2012/0166433 A1 | 6/2012 | Tseng |
| 2013/0159460 A1 | 6/2013 | Holsinger et al. |
| 2014/0249927 A1* | 9/2014 | De Angelo ........ G06Q 30/0269 705/14.64 |
| 2017/0091820 A1 | 3/2017 | Meeboer |

\* cited by examiner

**TARGET MEMBER SEGMENT
GEOGRAPHICAL DEFINITION**

◯ RADIUS  } 41

CENTER: YOUR LOCATION

DISTANCE: 1,000  UNIT: FEET

[AND]

◯ POLITICAL SUBDIVISION  } 42

COUNTRY: USA

STATE: GEORGIA

CITY: SANDY SPRINGS  [AND]

COUNTY: FULTON  [AND]

ZIP CODE: 30342  [OR]

[OR]

◯ ESTABLISHMENT  } 43

[ADD] GOLF COURSE  [AND]

[ADD] STADIUM  [OR]

[ADD] OFFICE BUILDING  [OR]

[ADD] HOME  [OR]

**TARGET MEMBER SEGMENT
DEMOGRAPHIC DEFINITION** — 50

- ○ SEX — FEMALE
- ○ AGE — 12-18 | 18-35 | 35-55
- ○ RACE — BLACK | HISPANIC
- ○ MARITAL — SINGLE | DIVORCED
- ○ EDUCATION — COLLEGE GRADUATE
- ○ OCCUPATION — HEALTH CARE
- ○ INCOME — 50,000 - 75,000
- ○ POLITICAL — REG REP | LEAN REP
- ○ RELIGION — CHRISTIAN | JEWISH

*FIG. 5*

**TARGET MEMBER SEGMENT
SUBJECT MATTER DEFINITION** — 60

- ○ COLLEGE — CLEMSON
- ○ SPORTS — FOOTBALL
- ○ SPORTS TEAM — CAROLINA PANTHERS
- ○ AUTOMOBILE — FORD EXPLORER
- ○ HOBBY — TENNIS
- ○ KEYWORD — FITNESS
- ○ KEYWORD — EXERCISE
- ○ KEYWORD — WEIGHT LOSS

*FIG. 6*

TARGET MEMBER SEGMENT
ONLINE QUERY DEFINITION

QUESTION

ANSWER A

ANSWER B

ANSWER C

ANSWER D

ANSWER E

MINIMUM RESPONSES

MAXIMUM RESPONSES

MAXIMUM DURATION

MAXIMUM QUERY COST

SUBMIT

*FIG. 7*

ONLINE QUERY OPT-IN PARTICIPATION MENU

| | | |
|---|---|---|
| DO YOU WANT TO PARTICIPATE IN ALL OPT-IN ONLINE ON THE FOLLOWING TOPIC? | ○ YES | ○ NO |

TOPIC OF INTEREST: POLITICAL ELECTION POLL  }} 81

| | | |
|---|---|---|
| DO YOU WANT TO PARTICIPATE IN ALL ONLINE QUERIES THAT YOU QUALIFY FOR? | ○ YES | ○ NO |  }} 82
| ACTIVATE STEALTH MODE? (DISABLE OPT-IN OFFERS) | ○ YES | ○ NO |  }} 83
| AUTHORIZE BASIC DEMOGRAPHIC DATA? | ○ YES | ○ NO |  }} 84
| AUTHORIZE DETAILED DEMOGRAPHIC DATA? | ○ YES | ○ NO |  }} 85
| AUTHORIZE SOCIAL MEDIA PROFILE? | ○ YES | ○ NO |  }} 86
| AUTHORIZE PROMOTIONAL OFFERS BY TEXT MESSAGE? BY EMAIL? BY TELEPHONE? | ○ YES ○ YES ○ YES | ○ NO ○ NO ○ NO |  }} 87
| AUTHORIZE PERSONAL CHAT REQUEST? | ○ YES | ○ NO |  }} 88
| AUTHORIZE PERSONAL CONTACT REQUEST? | ○ YES | ○ NO |  }} 89

MEMBER PROFILE UPDATE REQUEST

GREETINGS VALUED INSTANT RESPONSE SYSTEM MEMBER. WE HAVE NOTICED
THAT YOU LIKE TO EARN INCOME BY RESPONDING TO ONLINE QUERIES
AND HAVE LOCATION SERVICES TURNED ON TO ENHANCE YOUR QUERY PRIORITY.
THANK YOU FOR BEING SUCH A GREAT MEMBER!

DID YOU KNOW THAT YOU CAN INCREASE YOUR QUERY PRIORITY
AND EARNING POTENTIAL EVEN MORE BY UPDATING YOUR
INSTANT RESPONSE PROFILE TO INDICATE YOUR AREAS OF INTEREST?
IT IS EASY, JUST CLICK *HERE TO GO TO YOUR PROFILE.*

WE HAVE MADE UPDATING YOUR PROFILE EVEN EASIER!
WE NOTICED FROM YOUR LOCATION DATA THAT YOU OFTEN GO TO MOVIE THEATERS.
LET US KNOW IF YOU WOULD LIKE TO AUTOMATICALLY UPDATE YOUR
INSTANT RESPONSE PROFILE AS SHOW BELOW:

UPDATE PROFILE TO SHOW THAT I AM A *MOVIE BUFF*   ◯

PLEASE SEND ME *MOVIE RELATED PROMOTIONS*   ◯

PLEASE INCLUDE MY PROFILE DATA IN THE ANONYMOUS   ◯
INSTANT RESPONSE DATABASE

WELCOME TO FLIGHT TRACKING - TRAVELER INFORMATION

AUTHORIZE LOCATION TRACKING AND AGREE TO TERMS ☐  [READ TERMS]

CHECK TO ACTIVATE LOCATION TRACKING ☐

AUTHORIZED TRACKING PARTIES: [_____] [ADD]

| | | | |
|---|---|---|---|
| DEPARTURE: | FLIGHT NUMBER | AIRPORT | TIME |
| CONNECTING: | FLIGHT NUMBER | AIRPORT | TIME |
| CONNECTING: | FLIGHT NUMBER | AIRPORT | TIME |
| ARRIVAL: | FLIGHT NUMBER | AIRPORT | TIME |

WELCOME TO TRAVELER AWARENESS AND COMMUNICATION SYSTEM

| | | |
|---|---|---|
| ARRIVAL AIRPORT | ATLANTA | ADD |
| ARRIVAL WINDOW | | VIEW LIST |
| OPEN | 08/01/2016 | |
| CLOSE | 08/07/2016 | |
| | | |
| DEPARTURE AIRPORT | TAMPA | ADD |
| DEPARTURE WINDOW | | VIEW LIST |
| OPEN | 07/27/2016 | |
| CLOSE | 08/07/2016 | |

RUN SEARCH     VIEW RESULTS

---

| | | |
|---|---|---|
| GENERATE TEXT MESSAGE | BROWSE | FILE NAME |
| | COMPOSE | |
| | MAX RESPONSES | 500 |
| | EXPIRATION TIME | 8/07/2016 11:00 |
| | DEMOGRAPHICS | FILE NAME |
| | SEND | VIEW RESPONSE |

FIG. 19

SITUATIONAL AWARENESS AND SECURE DIRECT CONTACT INFORMATION DISCLOSURE SYSTEM

REFERENCE TO RELATED APPLICATIONS

This application claims priority to U.S. patent application Ser. No. 16/195,129 (U.S. Pat. No. 10,387,786), which claims priority to U.S. patent application Ser. No. 15/852,729 (U.S. Pat. No. 10,140,579), which claims priority to U.S. patent application Ser. No. 15/589,696 (U.S. Pat. No. 9,894,077), which claims priority to U.S. patent application Ser. No. 15/290,639 (Pat. Pub. No. 20170323209), which claims priority to U.S. Prov. Pat. App. Ser. No. 62/332,993.

TECHNICAL FIELD

The present invention relates to online situational awareness systems using location reporting mobile communication devices such as smartphones and, more particularly, to security features for the situational awareness system.

BACKGROUND OF THE INVENTION

Direct marketing is a $150+ billion industry, while market research and polling account for another $40+ billion each year. Increasing use of online commerce and social media creates new opportunities and presents new challenges for direct marketing and market research. Cost effective direct marketing and market research requires effective and efficient techniques for identifying the most appropriate target audience for each particular direct communication project and ensuring that the direct communication recipients actually read the polling or marketing information delivered to them. Properly identifying and motivating the target audience is often more important, and expensive, than locating raw address data to work with. While social media has experienced tremendous growth and contains a wealth of information concerning potential target audiences, direct marketing systems have not been developed to leverage this resource to advance market research and polling objectives.

Effective advertising and market research continue to be the keystones of a successful business. Despite continuing efforts to utilize online resources effectively, prior approaches to online market research and polling have been highly inaccurate with cost-prohibitive technical barriers preventing more accurate results. In addition, prior attempts to incorporate online resources into advertising have experienced very poor click-through and response rates. Existing technology for incorporating social media into market research and polling remains cumbersome and inaccurate. As a result, the current lack of affordable and effective direct marketing and research platforms presents a major barrier to entry for many companies, especially small and medium-sized businesses, which cannot afford to expend the vast sums necessary to reach their target audiences.

More generally, there is a further need for situational awareness of the demographic makeup and topical interests of people located in different geographic areas. This would allow very specific targeting and assessment of the size of targeted market segments before going to the expense of conducting promotional and market research activities. This type of situational awareness system would present useful information for a wide range of purposes other than advertising and market research activities. While this type of system can be extremely powerful, it also presents security concerns that could limit participation. These security concerns can therefore be addressed to prevent undesirable conduct and alleviate potential concerns that might otherwise inhibit members from providing access to their real-time location and profile data in order to participate in the situational awareness system.

There is, therefore, a continuing need for improved situational awareness systems and, more specifically, a situational awareness system to enhance the efficiency and effectiveness of market research and polling systems.

SUMMARY OF THE INVENTION

The present disclosure meets the needs described above in a situational awareness system including a range of security features. The security features may include requiring a security identifier, such as a password or a bio identifier, as a condition to providing situational awareness information. The system may also restrict situational awareness information to data pertaining to members that have creating a permission setting or responded to an "opt-in" prompt authorizing data from their profile to be included in the situational awareness information. Situational awareness information may also be denied to requesters identified as public offenders in a public offender database. Situational awareness information may also be restricted by access rules specified in a security rule base. For example, requesters enrolled in a particular university may only be allowed to obtain situational awareness information about other students enrolled in the university. Many different types of groups may be reflected in enrollment databases used to control situational awareness information, such as corporate employees, church groups, meet-up groups, and the like. As another example, the system may also impose security access rules based on the age of the requester and the age of a demographic profile of interest identified in the situational awareness request. Individual members may define, activate and deactivated security rules and permission settings on an as-needed basis giving each member the ability to control the use of their profile data in situational awareness information provided to third-party requesters.

In view of the foregoing, it will be appreciated that the present disclosure provides an improved situational awareness system. The specific systems and techniques for accomplishing the advantages described above will become apparent from the following detailed description of the embodiments and the appended drawings and claims.

BRIEF DESCRIPTION OF THE DRAWINGS

FIG. 4 is a conceptual illustration of a menu-driven graphical user interface panel for defining a geographical area of interest in the situational awareness system.

FIG. 5 is a conceptual illustration of a menu-driven graphical user interface panel for defining personal identity attribute data of interest in the situational awareness system.

FIG. 6 is a conceptual illustration of a menu-driven graphical user interface panel for defining a subject matter area of interest in the situational awareness system.

FIG. 7 is a conceptual illustration of a menu-driven graphical user interface panel for defining an online query in the situational awareness system.

FIG. 8 is a conceptual illustration of a menu-driven graphical user interface panel for opt-in participation in online queries in the situational interest awareness system.

FIG. 12 is a conceptual illustration of a menu-driven graphical user interface panel for prompting a member to update their member profile based on monitored location data to increase their online query priority.

FIG. 19 is a conceptual illustration of a user interface screen for a traveler awareness and communication feature of the situational awareness system.

DETAILED DESCRIPTION OF ILLUSTRATIVE EMBODIMENTS

Figure 1:
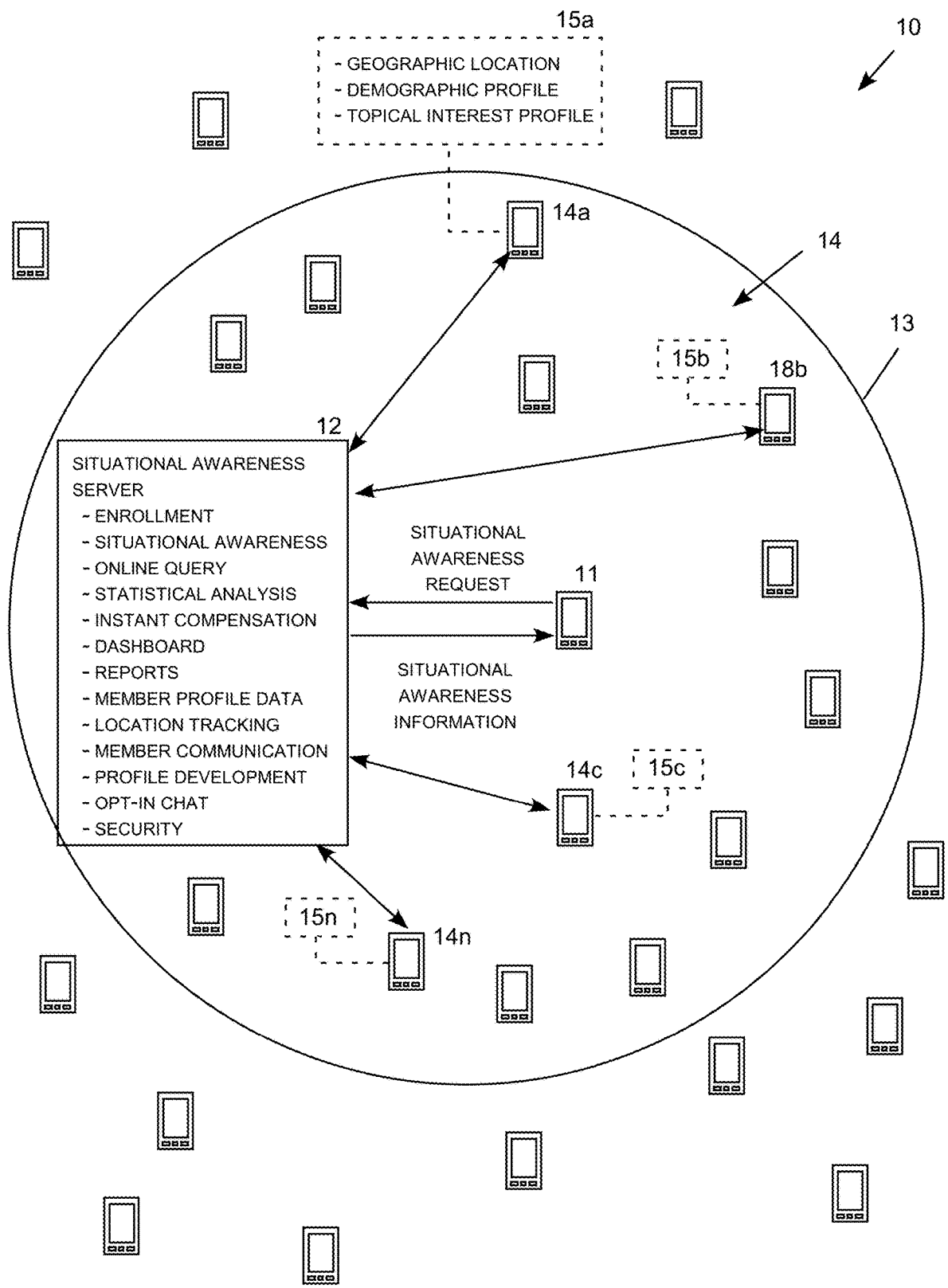
FIG. 1 is a conceptual illustration of a situational awareness system.

The present disclosure expands upon the market research and polling system described in U.S. Provisional Application Ser. No. 61/604,988 and U.S. application Ser. Nos. 13/781,744 and 14/285,803, which claims priority to U.S. Provisional Application Ser. No. 61/604,988 entitled "Systems and Methods for Collecting Marketing and Polling Data," filed Feb. 29, 2012. These applications are incorporated by reference. U.S. application Ser. No. 13/781,744 describes a permission-based membership market research and polling system referred to as the "instant response system" that provides per-response compensation to members that provide responses to online queries, which are typically transmitted through text messages to members' smartphones. U.S. application Ser. No. 14/285,803 is directed to aspects of the user interface for the instant response system. The subject matter of these applications will only be summarized briefly to set the stage for the present disclosure, which builds on the foundation provided by the prior applications. This application claims priority to U.S. Provisional Application Ser. No. 62/332,993 entitled "Situational Awareness System" filed May 6, 2016; and is a divisional application with most of the specification in common with U.S. patent application Ser. No. 15/290,639 entitled "Situational Awareness System" filed Oct. 11, 2017, which are also incorporated by reference.

The Instant Response System

The instant response system is a compensation driven, permission based marketing and polling system that utilizes per-response member query compensation, social media interfacing, and dynamic polling to produce desired personal data results with the minimum number of member requests. An illustrative example of the technology is referred to as the "1Q® instant response system" or more briefly as the "1Q system." While the 1Q system may be used for a wide range of objectives, such as direct marketing, market research surveys, polling, focus groups, and any other marketing or research objective relying on bulk responses to direct member communications, the description of the system refers to online queries (also referred to as surveys or polls) as an illustrative application of the technology. It will be appreciated that the 1Q system can be readily adapted to other direct response objectives by changing the content of the member communications.

The 1Q instant response system is permission based through a membership system in which members agree to participate by providing short turn-around anonymous responses to online queries in exchange for per-response compensation. Customers utilize the instant response system to conduct online queries of the members in exchange for a per-response compensation. The provider of the instant response system ("1Q system operator") earns the difference between the compensation received from the customer and the payments made to the member as compensation for operating the instant response system. For example, the customers may pay two dollars for each response received, while the members may be paid one dollar for each response provided. While other types of fees and payments may be utilized, the per-response compensation model is easy to understand and has been found to be highly effective in motivating participation by both members and customers on a basis that is transparent and easily measured and tracked by all involved.

Members of the instant response system provide permission to access their profile data (also referred to as personal identity attribute data), which may include real-time location data, through access to their social media profiles. Alternatively, member profile data may be stored in an instant response profile maintained by an app loaded onto their smartphones (e.g., the "1Q App"). Members are encouraged to provide access to their profile data, and increase the detail of the personal data and subject matter of interest included in their profiles, in exchange for earning compensation by participating in online queries. The situational awareness system may affirmatively prompt members to increase the detail in their data profiles, participate in online queries, and provide location data in order to improve their query priority and thus increase their ability to earn compensation by answering queries. Members may retain their compensation or designate a charity to receive the compensation earned by responding to online queries.

In order to participate in the compensation system, each member enters into a marketing participation agreement and provides the 1Q system operator with personal data information about the member, such as age, address, education, family, income, purchasing preferences, and so forth. The member is encouraged to provide greater levels of personal data and subject matter of interestdata to increase the likelihood they will be selected to participate in online queries. While membership questionnaires may run the range from basic to highly involved, the 1Q system may only request a bare minimum of information, such as the member's name and phone number, along with authorization to obtain additional member profile information from their social media resources, such as Facebook®. Members may also authorize 1Q to access and utilize information about the member from public resources, such as Equifax®. Members are encouraged to enter advanced personal data information into their social media resources and may, for example, create a "1Q" section specifically designed to contain member supplied information intending that information to be used by 1Q to determine their suitability and desire to be included in online queries relating to different areas of potential inquiry.

Advanced personal data and subject matter of interest profile data may include information such as professional information, areas of professional interest, areas of recreational interest, areas of expertise, hobbies, family information, political affiliations, associations, automobiles, vacation locations, preferred reading materials, major products or services recently purchased, major products or services they intend to purchase in the near future, health information, etc. While 1Q will keep all of the member's profile information and online query responses strictly confidential unless the member specifically authorizes disclosure, all of this personal data information as well as their prior online query response history can be used to anonymously target the member for online query participation. Members are therefore motivated to provide higher levels of personal data and subject matter of interest information to increase the likelihood that they will be selected to receive online queries based on the profile data provided. The personal data and subject matter of interestdata is contained in a member profile stored as part of the instant response system, where it can be used to target the member as an online query recipient. In this manner, the instant response system accumulates a great deal of personal data information about its members while simultaneously obtaining authorization to use this information for online queries, targeted promotions and market research purposes.

Members are also encouraged to allow the 1Q system operators to automatically post whenever the member receives compensation from 1Q on their social media resource. Although the fact of compensation is considered to be an effective posting, additional compensation related information may be automatically posted if desired, such as the amount of compensation, the number of online queries, the duration of membership, and so forth. Members may also authorize advanced features such as "friend tracking" and "location tracking" so that the number of friends on their site and their geographical location may be used as online query selection criteria. The member may also authorize an online query compensation "hot link" to the instant response system where the amount of online query compensation paid to the member is continually updated by the instant response system. Posting the fact of the member's participation in the 1Q system and member's online query compensation on social media provides effective advertising for the 1Q system provider motivating others to join as members. These and other social media factors can be tracked and used as ranking parameters to increase the member's priority as a potential online query recipient, thereby increasing the member's income potential through online query participation.

The 1Q system utilizes a dynamic polling algorithm that allows the 1Q online query results to satisfy online query constraints and very closely match target personal data defined by an online query request with a minimal number of online query responses. The online query constraints and target personal data provided by the customers as part of the online query request are typically obtained from actual personal data resources. The 1Q dynamic polling algorithm allows the online query to "hone in" on the desired personal data results with a minimal number of online query requests by submitting the requests to members forming the target audience in a priority order, computing the residual target personal data as online query results roll in, and continually adjusting the target audience to match the residual target personal data as the online query progresses. This allows the 1Q system to iteratively narrow the target audience to those members having the increasingly precise personal data needed to meet the target personal data as the online query progresses toward completion.

While dynamically converging on the target personal datas as described above, the 1Q system ranks the members in a priority order for inclusion in the online query using a number of weighting factors that take a number of factors into consideration in the weighting process. The weighting factors include a number of "system factors" that are considered beneficial to the 1Q system operator by encouraging membership growth and participation, along with a number of "customer factors" that are considered beneficial to completion of the online query with a minimum of requests by closely matching the target audience to the residual target personal data. The weighting is progressively shifted from system factors to customer factors as the online query progresses to meet both sets of objectives while fulfilling the online query request with a minimum number of online query requests.

The 1Q system may produce categorized online queries with multivariate relationships. Every poll specifies a number of personal data categories with defined criteria. To provide a simple example, a particular online query may specify age, geographic region, and ethnic race as personal data categories, with each category defining four criteria. A poll without multivariate relationships requires only that the overall online query results meet these personal data criteria. Multivariate relationships, on the other hand, specify the personal data results for the criteria within each category. Expanding the preceding example into a multivariate example, each "age" category has its own personal data complex of geography and race factors, each "geography" category has its own personal data complex of age and race factors, and each "rage" category has its own personal data complex of age and race factors.

Conducting a poll to closely match target personal datas with multivariate relationships is extremely challenging because the interrelating criteria result in a giant jigsaw puzzle requiring, for example, 5000 online queries to obtain the "right" 1000 responses that match the multivariate relationships of the target personal data. There are no polling systems currently available that are designed to produce poll results that closely match target personal data with multivariate relationships. To meet this challenge, the 1Q system includes a dynamic polling algorithm that matches target personal data with multivariate relationships within a defined margin of error, or presents the best available results, though the dynamic polling procedure. For example, the 1Q system may alert the customer, and provide the best available response, when the member database is simply not large enough to precisely match the multivariate personal data makeup of a national poll for a country of interest within the desired margin of error. In addition, the 1Q system may alert the customer, and provide the best available response, when an attempt to converge on a specific multivariate personal data makeup, within a specific margin of error, reaches a specified maximum online query time or number of responses.

Use of the 1Q system by poll designers and poll respondents is facilitated and encouraged by a user-friendly, menu-driven user interface system typically accessed with a conventional browser over an Internet connection. Thus any user with a browser and an Internet connection may participate as poll designers and/or poll respondents, although prior registration is typically required at least for poll respondents. A specific example of the user interface technology is further described below with reference to the appended figures, in which an online query (also referred to as a poll) is described as an illustrative example of the technology. Direct response sales, focus groups, political polls, and other direct response objectives may also be accomplished as a matter of design choice.

The Situational Awareness System

One of the unique aspects of the 1Q instant response system is the ability of members and customers to learn "situational awareness" information about other members around them without knowing specifically who those people are. Customers utilize a menu-driven system to gain situational awareness by identifying target member segments and receiving situational awareness information about the target member segments. Target member segments are defined by specifying one or more of a geographical area of interest, a personal data profile of interest, and a subject matter area of interest. The system identifies members corresponding to the target member segments and displays situational awareness data, such as personal data statistics for the target member segment, to the customer. The situational awareness data is typically displayed on a graphical representation of the geographic area of interest, typically superimposed on an underlying map. The customer may then create and broadcast promotional offers or online queries to the target member segment in accordance with selected query parameters. Customers typically pay for the promotional offers and online queries, and members receive compensation for answering the queries, on a per-response basis. Providing the customer with situational awareness information prior to issuing a query allows the customer to assess the size of a very tightly defined target member audience and set query parameters prior to issuing any promotional offers or online queries.

Customers utilize member profile data to identify and qualify members for participation in promotional offers and online queries based on one or more of real-time location, personal data, and subject matter of interest data for the members obtained from their member data profiles, which may be continually updated social media profiles. Customers are encouraged to conduct market research through the situational awareness system to obtain online query results through highly targeted member audiences at greatly reduced costs compared to conventional market research techniques. Fully menu-driven member enrollment, customer enrollment, target member segment definition, online query implementation, result reporting, and automatic payment features allow the member and customer base of the situational awareness system to grow autonomously (and potentially virally) without interaction by a human administrator on a member-by-member, customer-by-customer, or query-by-query basis.

Ongoing successful deployment of the situational awareness system results in a large and constantly growing membership base that provides permission-based, real-time access to member profile data including geographic, personal data, and subject matter of interest data for a large database of participating members. Members who are interested in earning compensation through the situational awareness system have a financial incentive to activate location tracking and provide highly detailed profile data that customers can use to direct highly targeted online queries and promotions to members with very specific personal data and subject matter areas of interest. These members have a similar financial incentive to provide location awareness, typically through online access to their social medial location feature, in order to receive geographically targeted online queries. For example, members at a sporting event can provide their real-time location data to the situational awareness system, and potentially indicate their team preference in their social media profile, in order to receive online queries and promotional offers directed specifically to fans of said team at the sporting event. Since the audience is highly targeted, sponsors can be expected to be able to afford more lucrative promotions. Online queries about the desire for future tickets, booster events, and fan clubs can then be directed to a highly qualified specific target member segment. Promotional offers can likewise be directed to the target member segment, such as discounts for future ticket sales, season ticket discounts, team clothing offers, post-game dining coupons, and so forth.

The instant response system working with member devices providing geographic location data can be used to provide situational awareness concerning members in a particular geographic area of interest regardless of whether the system is also used to send online queries or promotions to such members. Moreover, once a rich database of situational awareness system members has been developed, the membership can be utilized as a representative sample of the public at large. This provides opportunities for customers to glean generally applicable geographic, personal data and subject matter of interest awareness from the data provided by those members that have authorized access to their profiles. Situational awareness may therefore be highly useful regardless of whether promotions or online queries are also transmitted. For example, a member looking for a sports bar can quickly find out if the patrons in a particular establishment are predominantly fans of one team or another. As another example, a member looking for nightclub can quickly glean an indication of the age profile and male-to-female ratio for patrons in a particular establishment. Similarly, a customer interested in conducting a direct-mail campaign can quickly identify zip codes with desired personal data characteristics. The situational awareness system may also be used to revolutionize political polling, improve television ratings, provide similar ratings for online entertainment resources, track medical patients, track and locate lost children or members of other groups, communicate with product purchasers, facilitate meet-up groups, track and communicate with members of specific groups. and so forth. Online queries and other types of location-based services, such as promotions, chat, meet-up and so forth can then be leveraged from the geographic, personal data and subject matter of interest awareness provided by the situational awareness system.

Geographic, personal data and subject matter of interest awareness is accomplished using geo-location technology, where a customer or member can set a geographic boundary to identify all members of the situational awareness system within a certain geographical area, such as a radius of 1000 feet of where they are standing. Other types of geographic areas of interest may be a selected political subdivision (e.g., state, city, county, zip code) or a selected type of establishment (e.g., a stadium, restaurant, office building, etc.). These geographic definitions can also be combined to define compound geographic areas of interest, such as members on "golf courses in the state of Tennessee"; members in "national parks in the state of Maine"; members in "night clubs in Chicago" and so forth. The requester may also specify personal data criteria, such as gender, age category, education level, employment status, income level, etc. Subject matter of interest information may include detailed social media criteria, such as sports team preference, hobbies, age of children, type of automobile, and the like. This combination of geographic, personal data, and subject matter of interest criteria allows a target member segment to be defined and fine-tuned with a great deal of specificity.

A requester may also specify a particular subject matter of interest for online queries, such as political election subject matters, health and fitness subject matters, and so forth. Member participation in online queries may require interested members to "opt-in" to limit query distribution to members that are (a) qualified based on geographic and personal data criteria, (b) have indicated an interest in responding to online queries on the particular subject matter of interest in exchange for the designated compensation, and (c) meet certain security criteria. This greatly increases the efficiency and effectiveness, while reducing the cost and imposition of unwanted online communications on members who are not interested in participating.

Obtaining geographic, personal data and subject matter of interest awareness can be a free component provided as a benefit to registered members and customers, configured to occur prior to the payment screen required for online query or promotion distribution. This allows a customer or member to be charged if they send a message to the target member segment, which can be further limited to an opt-in member segment meeting certain criteria who have also authorized (opted-in) online queries on the specific subject matter of interest. As the situational awareness system grows to the point where the membership becomes generally ubiquitous and representative of the population in general, situational awareness becomes a truly revolutionary form of social networking offering the capability to know detailed information about the people who surround you, without knowing who, specifically, they are.

The opportunities for this type of situational awareness system are extensive and far reaching, ranging from individuals trying to find recreational venues, to companies trying to find potential customers, and political parties trying to identify potential voters to provide just a few illustrative categories of applicability. As a specific example, a patron in a sports bar can find out how many Buffalo Bills fans there are within 50 feet of where he is standing. A speaker at a conference could find out what percentage of his audience has household incomes above $250,000. Before leaving home, someone can find out the approximate male/female ratio at two different nightclubs they are considering visiting. Where there might be data missing or the sample set may not be large enough, location based services can be used to fill in the gaps. For instance, although everyone on a golf course may not be a 1Q member, if they are on the golf course, it is a good bet that they are a golfer. Furthermore, a historical database member location and other profile data that have visited a particular nightclub over a previous period of time can also be used or searched to help determine a personal data where live data may not be conclusive. Therefore, an indication that there is a mobile device in a specific area (e.g., on a golf course) can further provide data about a specific personal data. Furthermore, there could be 1Q members who are currently on a golf course but who have not self-identified as golfers or their social media profiles do not identify them as golfers. In this scenario, the aforementioned 1Q members could be listed as a golfer or labeled with a high probability of being a golfer when an online query comes in for all persons who are golfers and who are actually on/near the golf course. Therefore, as the database of available member profiles grows, so does the ability to learn various information about a geographically defined populous.

Additionally, a member could set their smartphone to vibrate or other type of notification any time they are within a specific distance of any segmented group. For example, a member could set his phone to notify him when he is within a certain range or number of people who work for the same company, belong to the same meet-up group, have children in the same school class or play on the same sports team, have a common medical condition, have read "Fifty Shades of Gray," or have any other personal data or subject matter of interest criteria reflected in the profile data of members of the system. As a security measure, requesters may only be provided with situational awareness data for groups in which they are enrolled. As another feature, the data query radius can be static or dynamic. A static query can say, please tell me how many persons are "Fifty Shades of Gray" fans within a 10-mile radius. A "reverse query" feature may also be configured to return an answer to a query such as "find the radius of the closest 100 Denver Bronco fans."

In another embodiment, the payment and incentive can be more granular. For instance, a first 1Q member who walks into a building can send an online query to determine "who are the active stock market investors in this building." A second 1Q member who is an active stock market investor currently located in that particular building receives a ping that says "there is a request for active stock market investors, would you like to opt-in to receive online queries directed to active stock market investors, yes or no?" If the second 1Q member answers "yes," then his or her social media profile or direct contact information may be presented to the first 1Q member along with an option to pay to send a specific online query or other inquiry (e.g., promotional offer, invitation for a consultation) to the second 1Q member. The first and second 1Q members may also be prompted to activate a "chat" session to communicate directly with each other.

In another embodiment, a ping could only be sent to 1Q members when a mutually beneficial relationship exists. For instance, if a first 1Q member is a lawyer and is looking for an investor, and a second 1Q member is an investor and is looking for a lawyer and they are within a predefined geographic radius of each other, then they both will receive a ping simultaneously to perform an ad hoc consultation for each other. In this scenario, both 1Q members may have to pay compensation to actually receive the profile information of the actual individual who they are requesting to meet. However, other payment options and scenarios can be available to facilitate the transaction.

In yet another embodiment, the 1Q system can help people to self-identify where they have not done so previously. For instance, a 1Q member may send out a poll wanting to know "who are the males between the ages 25-27 that like dogs within a 5-mile radius." The 1Q system then determines which other 1Q members meet that criteria. However, if a lower than expected number or no results are returned at all, yet there are definitely males between the ages of 25-27 within the 5-mile radius who have not self-identified as dog lovers, it may be possible to send the identified males a follow-up question to solicit the needed info. In this particular scenario, the follow-up question to males between the ages of 25-27 within a 5-mile radius would say, "do you like dogs?" Based on their responses, the 1Q system has helped some of the males to self-identify so that the 1Q member requesting the data will have a good sample set. The 1Q system may also prompt those who self-identify as dog-lovers to include this information in their profile data. If the 1Q system enters this data into the member's profile or otherwise receives an indication that the member has updated their profile, the 1Q system may increase the member's online query priority to increase the likelihood that the member will receive online queries and promotions. The increase in online query priority may apply to the member generally or specifically for online queries and promotions related to dogs.

The situational awareness system can also assist in building subject matter of interest profiles for members using location tracking information. Members who participate in the system activate location tracking on their mobile devices and provide the system with real-time access to the location tracking data. The situational awareness system analyzes a member's location tracking data, detects potential subject matters of interest for the member based on the location tracking data, and then prompts the member to update their profile data to include the detected potential subject matters of interest. If the member adds a suggested subject matter to their profile, the situational awareness system includes the member in situational awareness information provided to requesters seeking information concerning members interested in the added subject matter. The situational awareness system may also direct online queries to the member relating to the added subject matter and increase the member's priority for participating in online queries. The member has a financial incentive to authorize location tracking and add subject matters of interest to their profile in order to increase their ability to earn compensation by participating in compensation-based online queries.

It should be noted that along with the ability to determine specific sets of persons based on their location, personal data and subject matter of interest information, there will inherently arise a need for security governing the use and inclusion of such information in situational awareness information provided to third-party requesters. To minimize nefarious activity, certain parameters or restrictions can be placed on how and what type of information is obtained. For instance, a mother may want to know how many children between the ages of 9-12 are on the playground so that she can decide to take her 10-year-old child there if the age personal data aligns with the age of her child. However, a pedophile may want to use the same information for nefarious reasons. There are several ways to address the above situations. To combat the potential problem, the 1Q system aligns certain data points to mitigate nefarious activity. For instance, if the request for the number of 9-12 year olds comes from a person outside of a specific age bracket, then the request can be denied. In this instance, the request will be denied because the mother is not within the age bracket of 9-12. However, if the request came from her child or the child's mobile device, the request would be granted because he is of the personal data for which information is being requested. The child's age could possibly be confirmed via biometric data associated with his mobile device. An additional layer of security can utilize biometric data. For instance, in the above-noted example the 10-year-old is able to determine a specific personal data related to children who are between the ages of 9-12 because he is of that personal data, therefore biometric information can be used to confirm that the 10-year-old is actually of the personal data which he is querying. The biometric data can comprise fingerprints, retina scans, digital photographs, etc. The situational awareness system compares biometric data received from situational awareness requesters to verified biometric data stored by the system to prevent unauthorized access to situational awareness information.

In another embodiment, the information might be restricted altogether, meaning that it would never be appropriate to provide data on anyone below the age of 15. Alternatively, external data can be used to reconcile the information to determine if providing the information is appropriate. For instance, a pedophile has to register with the local government agency under a disclosure law. This information would then be sent to 1Q or pulled from external sources (e.g., public offender database, social media) so that personal data information of anyone under the age of 21 is never presented to a registered pedophile.

In another embodiment, the 1Q system can leverage maximum and minimum data for security measures. For instance, a 1Q user in a room with only 3 other 1Q users can check the 1Q system to determine how many people within 10 feet of him are Republicans. Because the 1Q system can set a mandatory minimum for certain sensitive data points, the query may come back as null or not enough persons. The minimum may require that there be at least 10 people present for this type of data to be divulged. However, there could also be an end-around where the 3 other 1Q users have indicated that they do not care if anyone specifically knows they are Republicans. Therefore, if all 3 users or some subset of the users have waived their right to this security measure, then the info can be presented to the 1Q user who has requested it. Additionally, a 1Q member may be super secretive about their party affiliation and feels that even with the 10-person minimum, there are still too few people in the room for him to feel comfortable and he would like the minimum to be no less than 15. In this scenario, the 1Q member can have the opportunity to store this type of data as a part of his profile, so that if the situation ever arises, instead of the system defaulting to the 10-person minimum, the system will go to a 15-person minimum, thereby facilitating a higher level of protection. The system can have the ability to accept the highest level of protection requested by any user in a group of users, extrapolate any outliers, or average the requested protection levels. In the case of an average, the system can indicate such to the persons with a security protection level higher than that of the average so that he/she will know that the defaulted security level is less than what he/she anticipated.

Additionally, the system can suggest polling parameters in response to an indication that certain information is restricted due to security reasons. For example, if a member requests to know all of the persons within a 10-foot radius that are Democrats and there are only three 1Q members in the room and there is a security minimum of 10, then the 1Q system might suggest that the requestor expand his search area to a 30-foot area where the system has already determined that there are at least 10 Democrats within the 30-foot range.

A member can also choose to go into stealth mode by limiting the information that is available about them based on a specific geographic location, time of day, etc. For instance, a member's profile can list that she is a Falcons fan, but because she works for a company that does a lot business with the Dallas Cowboys she can go into stealth mode from the hours of 9 am-5 pm when she is on business travel in Dallas. Therefore, when she is in the presence of the Dallas Cowboys, they cannot poll 1Q to determine or verify that she is indeed a Falcons fan. The security features may include requiring a security identifier, such as a password or a bio identifier, as a condition to providing situational awareness information. The system may also restrict situational awareness information to data pertaining to members that have created a permission setting or responded to an "opt-in" prompt authorizing data from their profile to be included in the situational awareness information. Situational awareness information may also be denied to requesters identified as public offenders in a public offender database. Situational awareness information may also be restricted by access rules specified in a security rule base. For example, requesters enrolled in a particular university may only be allowed to obtain situational awareness information about other students enrolled in the university. Many different types of groups may be reflected in enrollment databases used to control situational awareness information, such as corporate employees, church groups, meet-up groups, and the like. As another example, the system may also impose security access rules based on the age of the requester and the age of a personal data profile of interest identified in the situational awareness request. Individual members may define, activate and deactivated security rules and permission settings on an as-needed basis giving each member the ability to control the use of their profile data in situational awareness information provided to third-party requesters.

One particular illustrative example of the situational awareness system, including an optional polling feature, is described below with reference to the appended figures. It should be understood that this particular example, and the user interface screens, are simplified for the purpose of illustrating the principles of the disclosure. Many other details, features and options will become apparent to those skilled in the art once the principles of the disclosure are appreciated.

FIG. 1 is a conceptual illustration of a situational awareness system 10, which may be deployed as a set of features of the previously described instant response system. The system allows a requesting device 11, typically associated with a customer or member of the instant response system, to submit a "situational awareness request" and in response receive "situational awareness information" about other members within a target member segment defined by the situational awareness request. The situational awareness request includes one or more of geographical, personal data, and subject matter awareness information defining the target member segment. The situational awareness information includes data representing the members corresponding to the request referred to as the "target member segment." The data representing the target member segment, such as personal data statistics, may be presented to the requester on a geographic representation of the geographic area of interest defined by the request. The situational awareness information is typically provided anonymously by providing personal data statistics of the target member segment without divulging the identities of the individual members of the target member segment. The identities of specific members, the ability to send online requests to specific members, and/or the ability to communicate directly with specific members may be granted with the "opt-in" consent of the specific members of the target member segment.

To illustrate one specific example, a situational awareness request submitted by the requesting device 11 to a situational awareness server 12 identifies a geographic area of interest 13 defined as a radius around the current location of the requesting device. Each member profile participating in the situational awareness system is represented by the mobile devices shown within the area of interest 13. To participate in the situational awareness system, these devices are activated to provide location data to the situational awareness server 12. Each member device is associated with a member profile that includes personal data and subject matter of interest data for the corresponding member. The geographic location, personal data and subject matter of interest member profile data is stored in the member's social media data or in an instant response app running on the member's device, which is usually a smartphone. In addition to the geographic data defining the geographical area of interest, the situational awareness request submitted by the requesting device 11 includes personal data defining a personal data profile of interest and subject matter of interest data defining a subject matter of interest. The target member segment corresponding to these criteria is identified by comparing the member profile data for all of the participating members within the area of interest 13 to the personal data profile of interest and the subject matter of interest included in the situational awareness request.

The member devices 14a-n with member profile data 15a-n corresponding to the situational awareness request form the target member segment corresponding to the situational awareness request. The situational awareness server 12 presents the requesting device 11 with situational awareness information, which typically includes personal data statistics representing the member profile data 15a-n of the target member segment on a graphical representation of the geographic area of interest 13 shown on a map encompassing the geographic area of interest. While this area is shown as a circle on a blank field to avoid cluttering the display, the situational awareness results may be superimposed on an underlying map. The geographic area of interest 13 may also correspond to a political subdivision, such as a country, region, state, county, city, zip code and the like. The geographic area of interest 13 may also correspond to one or more establishments, such as a stadium, office building, golf course, and so forth. These criteria may so be combined, for example to specify all golf courses in a particular state, or all office buildings in a particular zip code, and so forth.

Providing on-demand situational awareness including statistical personal data representing anonymous target member segments as described above is an important advantage in its own right. As the member database expands to the point where it fairly represents the population in general, a great deal of information can be instantly gleaned based on various target member segments that any member or customer can define on the fly using only their mobile device. For example, a requester may instantly determine the male-to-female ratio, age, ethnic, educational, professional, and sports fan makeup of the patrons in a particular establishment before setting foot in the premises. As another example, the requester may instantly determine similar information for an apartment complex, office building or college campus. Providing an assessment of personal data and subject matter of interest statistics for the general population in a particular geographic area based on the situational awareness information for system members in that particular area can be a very effective tool for an advertiser. Than information can be effectively used, for example, when purchasing print, direct mail, radio, television, online or other types of communications directed to the general population in that geographic area. For example, an analysis indicating that 60% of the system members in a particular geographic area meet a particular personal data or subject matter of interest criteria (e.g., income level) may be considered to be a good indication that a similar proportion of the general population in the geographic area meet that criteria.

Once a target member segment has been identified, the situational awareness system provides a range of additional functionality, typically on an opt-in basis for members of the target member segment that agree to participate. For example, the requester may send an online request, promotional offers, chat requests, personal meetings, and other communications based on or requesting access to the identities of members of the target member segment that have opted-in for this service. A range of security features may be implemented to protect the target member segment from harassment and nefarious activity, such as checking information about the request and the requester against an access rule base to determine whether to permit or reject a particular request.

Members may be also invited to update their member data profiles based on an analysis of their location data as a way to increase their visibility to online query submitters. This can increase the member's online query priority and ability to earn income by responding to online queries, and also avail the member to targeted online communications while they are present in specific venues. Members may also be prompted to activate location reporting or permission to receive online queries based on their location to enable them to participate in online queries, promotions or other programs. For example, a member with location reporting turned on may receive a prompt to receive grocery shopping related online queries and promotions while they are present in a grocery store. As another example, a member may receive a prompt to participate in online queries and promotions when they are present within a stadium so that they can participate in online programs relating to the event taking place at the stadium. Similarly, a member may receive a prompt to participate in golf related online queries and promotions when they are present on a golf course. As another example, a member may receive a prompt to participate in tourism related online queries and promotions when they are away from their home city or present at a tourist attraction. Shortly after touching down at a ski resort, for example, a member may be prompted to authorize ski related online queries and promotions, such as coupons for lift tickets, equipment rentals and restaurants in the resort area.

The situational awareness server 12 provides the central processor of the system, while each member and customer only needs a mobile device, such as a smartphone, to participate. Each member and customer device typically utilizes an app (e.g., the 1Q app) downloaded onto the device, although member devices may be configured to participate using only a standard browser, text functionality, and access to the member's social media profile. Member devices expose profile data, which includes geo-location data to participate in location-based situational awareness services, on a permission basis. The member's profile data may be stored in a social media profile or the instant response app, which is specially configured to store detailed personal data and subject matter of interest data to enhance the member's ability to participate in the instant response system. The situational awareness system 12 provides a wealth of functionality that members and customers can access on a menu-driven, self-service basis including, but not limited to, members and customer enrolment, situational awareness, online query submission, statistical and display analysis of online query results, members and customer instant compensation, dashboard graphical display with map overlays, report generation, member profile data collection and analysis, location tracking, member communication for opt-in situational awareness and online query participation, member profile development, opt-in chat and other types of direct contact, and a range of security features. It should be appreciated that the situational awareness system is an extraordinarily powerful platform with an enormous range of potential features and applications. This disclosure only describes a small selection of those potential features and applications to demonstrate the principles of the disclosure.

Figure 2:
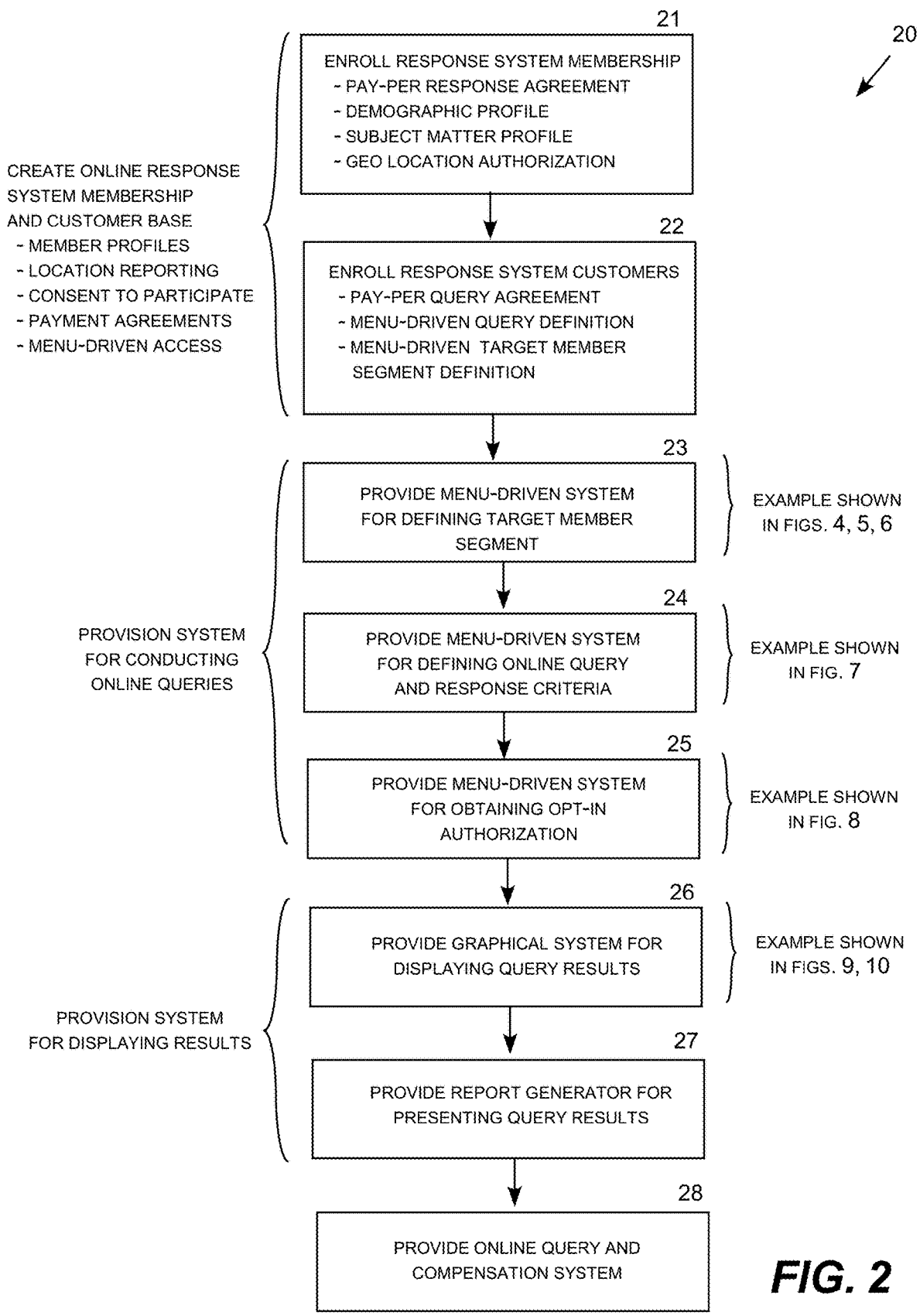
FIG. 2 is a logic flow diagram for provisioning the situational awareness system.

FIG. 2 is a logic flow diagram 20 for provisioning a situational awareness system for identifying target member segments based on geographic, personal data and subject matter of interest data. Once the situational awareness system is configured as described in FIG. 2, it will be ready to run for member and customer services as described with reference to FIG. 3. Although a computing system could provision the system, the configuring entity will be referred to as the "enrollment system" for descriptive convenience.

In step 21, the enrolment system obtains situational awareness system members to create a large database of system members. Members typically enter into pay-per-response agreements where they agree to respond to online queries in exchange for a per-response payment for each response accepted by the situational awareness system (e.g., $1 per response). The member earns cash by responding to online queries in exchange for allowing the situational awareness system to access their member data profiles, which is referred to as compensation-based and permission-based member participation. Members create detailed personal data profiles (e.g., gender, age, race, domicile location, job location, education level, employment type, income level, family information, political preference, political party registration, religion, etc.) and detailed subject matter profiles indicating subject matter areas of interest (e.g., college sports affiliation, professional sports team affiliation, hobbies, type of residence, type of automobile, preferred shopping venues, preferred entertainment, etc.). Members are encouraged to provide highly detailed profile data and respond frequently and promptly to online queries in order to increase their query priority, which takes these factors into account when prioritizing members for inclusion in online queries. This financial incentive is highly effective in building a large database of members who are eager to participate. The member profile data is typically stored in a social media or situational awareness system data profile created with a special purpose app (e.g. 1Q app) downloaded onto the member's mobile device.

In order to participate in location-based situational awareness services, the member can also activate location tracking, provide the situational awareness system with access to the member's location data, and authorize use of the member's location data. The authorization may include one or more of (a) receiving geographic, personal data and subject matter of interest awareness information, (b) receiving location-based online queries, (c) receiving location-based online promotions, (d) participating in location-based online meet-ups, and (e) allowing their location data to be anonymously used in the situational awareness system aggregate member database. Members are incentivized to participate in location-based services in order to increase their potential earnings and to gain the benefit of being able to utilize the geographic, personal data and subject matter of interest awareness services themselves. Many members are expected to find the ability to receive situational awareness information by itself to be sufficient motivation to grant access to their location data even if they are not interested in participating in other location-based services.

In step 22, the enrolment system obtains situational awareness customers to create a large database of system customers. Customers enter into pay-per-response agreements where they agree to pay a per-response fee to create and submit online queries that they submit through the situational awareness system (e.g., $2 per response). Customers receive access to the situational awareness menu-driven system for creating online queries and defining target member segments (e.g., geographic area of interest, personal data profile of interest, and subject matter area of interest). Customers are then able obtain to geographic, personal data and subject matter of interest awareness and use this information to send location-based online queries to target member segments that they identify themselves as they use the situational awareness system.

Steps 23 through 25 describe the process for allowing enrolled customers to define target member segments and submit online queries. In step 23, the enrolment system provides the enrolled customers and members with access to a menu-driven system for defining target member segments for situational awareness requests, which includes defining one or more of a geographic areas of interest, a personal data profile of interest, and a subject matter area of interest. Illustrative and simplified examples of menu-driven interfaces for these purposes are shown in FIG. 4 (define a geographic area of interest), FIG. 5 (define a personal data profile of interest), and FIG. 6 (define a subject matter area of interest). In step 24, the enrolment system provides enrolled customers with access to a menu-driven system for creating online queries and query parameters. An illustrative and simplified example of this menu-driven interface is shown FIG. 7 (define online query and query parameters). In step 25, the enrolment system provides enrolled members with an opt-in panel for authorizing participation in the location-based services. An illustrative and simplified example of this menu-driven interface designed to illustrate the principles of this aspect of the embodiment of the disclosure is shown FIG. 8.

In step 26, the enrolment system provides enrolled customers with access to a "results dashboard" that allows customers to view online query results in a wide range of useful ways. Illustrative and simplified examples of results display screens are shown FIGS. 9 and 10. In step 27, the enrolment system provides enrolled customers with access to a "report generator" that allows customers to create and download reports describing online queries at their own discretion. In step 28, the enrolment system implements the financial arrangements suitable for automatically paying members (e.g., one dollar per response) and charging customers (e.g., two dollars per response) on a per-response basis to enable customer and member-driven operation of the situational awareness system without the involvement of a system administrator on a query-by-query basis. This typically involves setting up a credit card, Paypal® or electronic transfer to a bank account to charge customers, and a Paypal or electronic transfer to a bank account to pay members. The compensation preferably works automatically so that human intervention is not required for each customer charge and member payment transaction.

Figure 3:
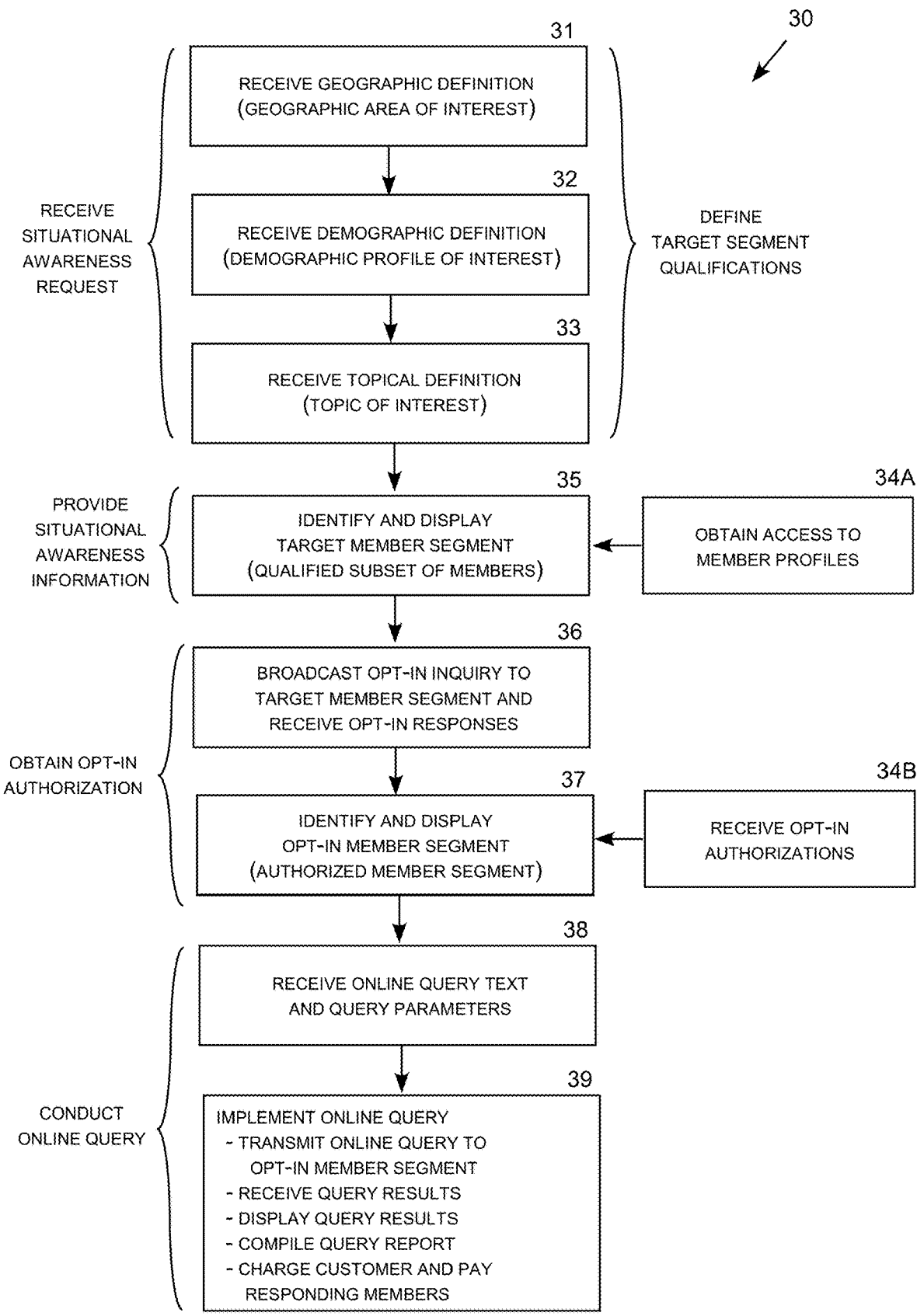
FIG. 3 is a logic flow diagram for operating the situational awareness system.

Once the situational awareness system has been configured as described above with reference to FIG. 2, the system may be operated by members and customers without human intervention except when needed for customer and member support on a case-by-case basis. FIG. 3 is a logic flow diagram 30 for operating the situational awareness system including geographic, personal data and subject matter of interest awareness. In step 31-33, a requesting customer provides the situational awareness system with a situational awareness request defining a target member criteria for identifying a target member segment corresponding to those criteria. In this example, in step 31, the system receives a geographic definition identifying a geographic area of interest. In step 32, the system receives a personal data definition identifying a personal data profile of interest. And in step 33, the system receives a subject matter of interest definition identifying a subject matter of interest. In step 34A, the system obtains access to member profile data, which may include prompting members to turn on location reporting in order to participate in the situational awareness system. In step 35, the system compares the target segment criteria to the member profiles of the participating members within the geographic area of interest to identify the target member segment. The system then displays data representing the target member segment for review by the requester. For example, the system may display dots or shades of color representing the general locations or density of the member devices in the target member segment together with personal data statistics of the target member segment on a graphic representation of the geographic area of interest overlaid on a map encompassing the geographic area of interest. The requester may be able to zoom-in to obtain more precise location information only for individual members that have activated a permission setting or provided opt-in permission authorizing their location data to be disclosed in this manner.

If the requesting customer wants to go beyond situational awareness and contact members of the target member system, in step 36 the system broadcasts an opt-in inquiry to the target member segment prompting the members to participate in online queries. This may include encouraging members of the target member system to participate by identifying the subject matter of interest, indicating whether promotions will be offered, identifying the requester (if authorized by the requester), reminding the members that they can earn compensation by opting-in and responding to online queries, and so forth. In step 34A, the system receives op-in authorizations and in step 37 the system displays data representing the opt-in member segment to the requester. At this point, the requester may be prompted to change the target member criteria if deemed advantageous to garner a larger opt-in member segment. For example, the requester may be prompted to enlarge the geographic area of interest or broaden the personal data profile of interest or the subject matter of interest if the size of the opt-in member segment is below a certain threshold.

Once an acceptable opt-in member segment has been identified, in step 38 the system receives an online query and query parameters. In step 39, the system implements the online query in accordance with the query parameters and displays the results. In general, this includes transmitting the online query to the opt-in member segment, receiving responses, displaying the query results, compiling a report containing a statistical analysis of query, charging the requesting customer, and paying those members that submitted accepted responses. The query may be implemented in the manner described in U.S. application Ser. No. 13/781, 744 with the results displayed in the manner described in U.S. application Ser. No. 14/285,803, which are incorporated by reference. Security measures may also be applied as described with reference to FIGS. 14-15.

FIG. 4 is a conceptual illustration of a menu-driven graphical user interface panel 40 for geographical definition in the situational awareness system. The panel 40 allows the user to select three types of geographic areas, which may be joined with Boolean operators. The first selection section 41 allows the user to select a radius around a particular location in selected units, such as feet or miles. The user can select the current location of the device being used to enter the request provided that the requesting device has location reporting turned on. The user can also enter any other location recognized by the system, such as an address or longitude and latitude definition. The second selection item 42 allows the user to select a political subdivision, such as a country, state, city, county or zip code. The third selection section 43 allows the user to select a type of establishment, such as golf courses, stadiums, office buildings, and so forth. The geographical selections may be joined by Boolean operators to define composite definitions of geographical areas of interest, such as all stadiums in the state of Georgia, all golf courses in Fulton County, or all restaurants within five miles of the requester's current location.

FIG. 5 is a conceptual illustration of a menu-driven graphical user interface panel 50 for personal data definition in the situational awareness system. The system benefits from prompting users to enter detailed personal data that customers can then use to hone in on specific target member segments. This particular example allows members to enter detailed personal data including sex, age, race, marital status, education, occupation, income, political party preference, and religious affiliation. Additional personal data detail can be specified and added in response to prompts posed by customers that want to identify members meeting specific personal data criteria. For example, a specific customer may want to identify members who are cancer survivors to participate in an online query in exchange for certain compensation. The system may broadcast a query to the membership asking members who meet the criteria to self-identify in exchange for the ability to participate in queries directed to cancer survivors in exchange for the offered compensation. The category "cancer survivor" would then be added to the profiles of members who opt-in to the category. The member's participation would typically be provided on an anonymous basis unless they opt-in for individual contact at some point further in the process. Many different target member segments can be identified in this manner, such as members with school age children, members who are registered to vote in primaries, or any other qualities of interest. As another example, special purpose groups and enrolment lists may be defined on an as-needed basis. For example, a school class may create a special purpose group and enrolment list for tracking and communicating with students on a field trip. A family may create a special purpose group and enrolment list for tracking and communicating with family members on a vacation. A company may create a special purpose group and enrolment list for tracking and communicating with employees and contractors working on a job site. A medical testing lab may create a special purpose group and enrolment list for patients participating in a drug trial. A political action group may create a special purpose group and enrolment list for supporters participating in a political campaign, a government agency may create a special purpose group and enrolment list for persons participating in a program managed by the agency, and so forth.

FIG. 6 is a conceptual illustration of a menu-driven graphical user interface panel 60 for subject matter of interest definition in the situational awareness system. All of the prompts described in this disclosure are designed to be sent by text message, but may also be sent by email or any other suitable medium. This particular example prompts members to enter subject matter of interest data in several categories, including preference indications for college, sports, sports team, automobile, hobby, and several keywords. Many different target member segments can be identified in this manner, such as members that like to go to movies, members that ride bicycles frequently, members that own particular types of cars, members that own their own homes, members who have consumed certain products, and so forth. Again, additional subject matter of interest details can be specified and added in response to prompts posed by customers that want to identify members with specific interests.

FIG. 7 is a conceptual illustration of a menu-driven graphical user interface panel 70 for online query definition in the situational awareness system. This particular example includes a question definition section 71 where the requester enters a question up to a predefined number of characters. The requester also enters up to five multiple-choice answers, each up to a predefined number of characters. A query parameter section 72 allows the requester to enter a minimum number of responses, a maximum number of responses, and a maximum query duration period. The system displays the maximum query cost, typically based on the maximum number of responses entered for the query and the requesting customer's per-response cost. Once the requester is satisfied with the query definition and parameters, they select "submit" to launch the query, FIG. 8 is a conceptual illustration of a menu-driven graphical user interface panel 80 for opt-in participation in online queries in the situational interest awareness system. The interface pane; 80 may be used to prompt a member identified as part of a target member segment to "opt-in" to participate in online-queries and to set parameters for participating in online queries generally. Selection item 81 allows the member to opt-in for a particular online query on an identified subject matter of interest. Section item 82 allows the member to opt-in generally for all queries that they qualify for without having to opt-in on a query-by-query basis. Section item 83 allows the member to enter a "stealth mode" disabling online queries. Selection item 84 allows the member to authorize disclosure of their basic personal data (e.g., gender, age and race) in connection with authorized online queries. Selection item 85 allows the member to authorize disclosure of their detailed personal data in connection with authorized online queries (e.g., education level, profession, income level, political affiliation). Selection item 86 allows the member to authorize disclosure of personal data and subject matter of interest data in their social media profile in connection with authorized online queries. Selection item 87 allows the member to authorize promotional offers directed to a target member segment that includes the member. In this example, the member is prompted to separately authorize promotions by text message, email and telephone contact. Selection item 88 allows the member to authorize personal chat requests directed to a target member segment that includes the member. Selection item 87 allows the member to authorize personal contact requests directed to a target member segment that includes the member.

Figures 9, 10:
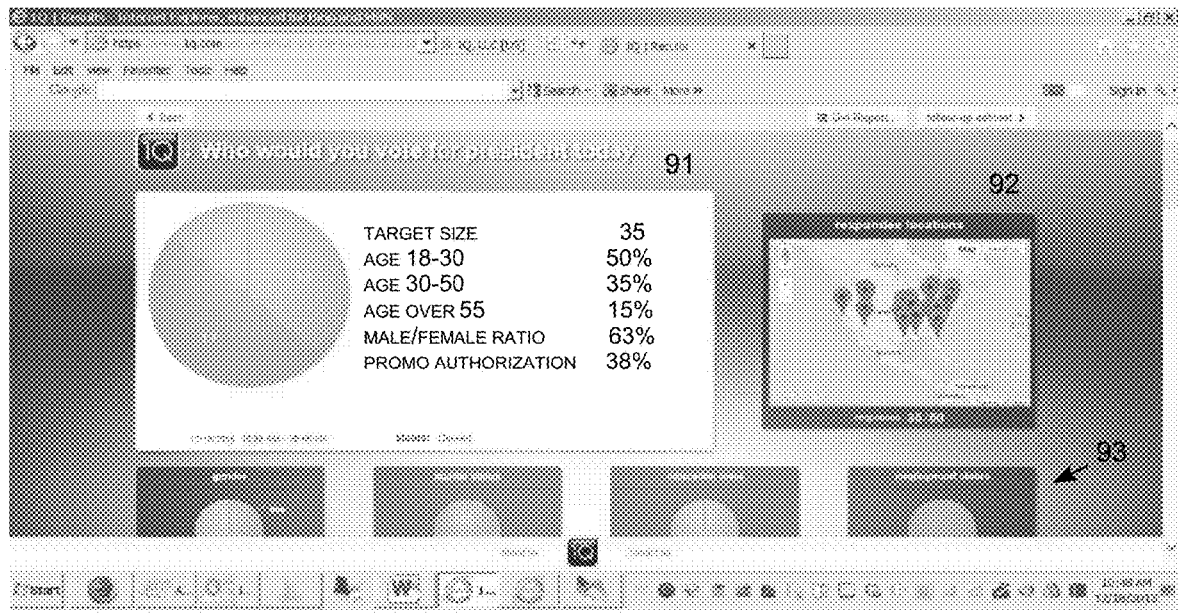
FIG. 9 is a conceptual illustration of graphical presentation of online query results in the situational awareness system.
FIG. 10 is a conceptual illustration of an alternate graphical presentation of online query results in the situational awareness system.

FIG. 9 is a conceptual illustration of graphical presentation 90 of online query results in the situational awareness system. Display panel 91 shows personal data for the target market segment. In this example, the personal data includes the target market segment size, the age distribution, the male-to-female ratio, and the percentage of the target market segment that has authorized promotional offers. Basic personal data may be provided without charge while higher levels of personal data could be provided for compensation. The personal data allows the requester to immediately ascertain the size and personal data makeup of the target market segment corresponding to the parameters specified by the requester before taking additional steps, such as sending an online query or promotional offers to the target market segment, which typically incurs compensation. Knowing the size and personal data makeup of the target market segment helps the requester frame appropriate query parameters before sending out queries. Display panel 92 shows a representation of the target market segment on a graphic representation of the geographical area of interest, in this example the United States. The members of the target market segment may be illustrated by pins (as in this example), dots, color shades, or any other suitable representation of response density. Additional display panels 93 show graphical representations of various personal data statistics of the target market segments. FIG. 10 is a conceptual illustration 100 of an alternate graphical presentation of online query results in the situational awareness system. In the example, the same statistics shown in the form of pie charts in FIG. 9 are displayed as histograms in FIG. 10.

Additional illustrative examples of graphical user interface formats and features that can be used to display situational awareness information are shown and described in U.S. application Ser. No. 14/285,803, which is incorporated by reference. The graphical user interface system presents real-time progress information and online query results in concise at-a-glance formats. The user interface makes the system intuitively easy for non-trained personnel to use, both as poll designers and as poll respondents. The at-a-glance user interface screens allow system participants to easily enroll as pay-per-response members and customers. Simple and intuitive user interfaces allow participants to easily and quickly answer multiple-choice online queries on their smartphones and other common user communication devices. The at-a-glance user interface screens for online query designers allow the designers to easily define online queries, monitor results in real-time, and view the results on geographic and personal data bases. Taken together, the highly intuitive, easy-to-use, and easy-to-understand customer and member user interface screens enable broad enrollment and participation by a much wider audience that conventional market polling and research systems.

Figure 11:
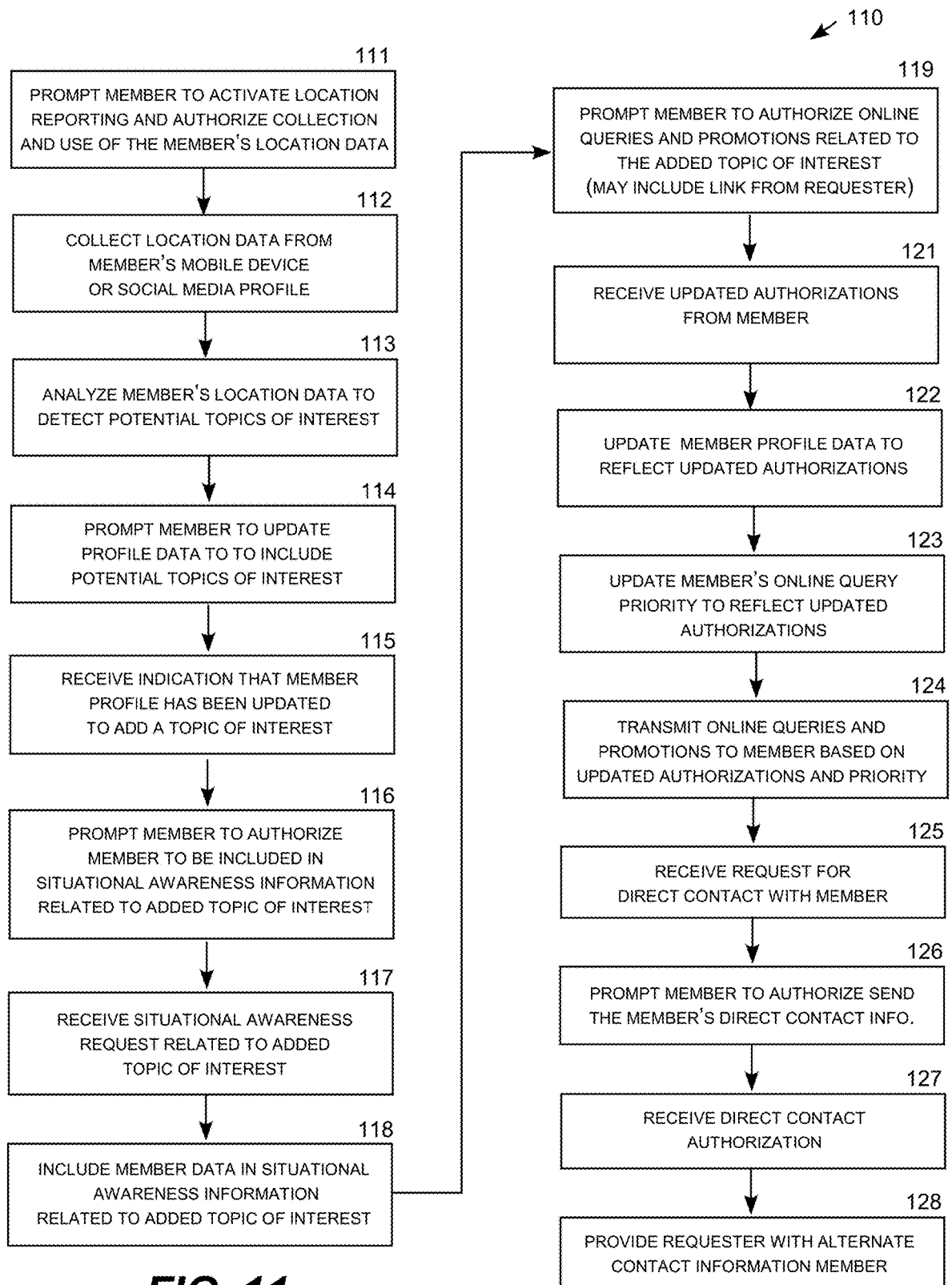
FIG. 11 is a logic flow diagram for prompting a member to update their member profile based on monitored location data to participate in situational awareness services and increase their online query priority.

FIG. 11 is a logic flow diagram 110 for prompting a member to update their member profile based on monitored location data to participate in situational awareness services and increase their online query priority. Obtaining location data about a member's mobile device allows the member to be included in situational awareness data provided to customers and other members. In step 111, the situational awareness system prompts the member to activate location reporting on the member's mobile device and authorize the situational awareness system to monitor and use the member's location data. In step 112, the situational awareness system collects location data from the member's mobile device or social media profile. In step 113, the situational awareness system analyzes the member's location data to identify potential subject matters of interest. In step 114, the situational awareness system prompts the member to update their member profile data to include one or more potential subject matters of interest suggested by the system. In step 115, the situational awareness system receives an indication that the member's profile has been updated to include a subject matter of interest suggested by the system. This may involve the system or the member updating the member's profile data so long at the system becomes aware of the profile update.

In step 116, the situational awareness system may prompt the member to authorize the member's location and/or profile data to be included in situational awareness information related to the added subject matter of interest. This authorization generally acknowledges that the member understands that one or more of their location, personal data, and subject matter of interest data from their online profile will be anonymously provided to situational awareness requesters as part of statistics representing target member segments. In step 117, the situational awareness system receives a situational awareness request from a third-party requester (i.e., a member or customer other than the member) related to the added subject matter of interest. In step 118, the system includes data pertaining to the member in situational awareness information provided to the requester.

In step 119, the situational awareness system prompts the member to authorize online queries and promotions related to the added subject matter of interest based the analysis of their location data. For example, if the member is found to be frequently present on golf courses, they may be prompted to add "golf" as an area of interest in their member profile data, authorize online queries related to golf, and authorize promotions related to golf. Similarly, a member found to be frequently present in a particular XYZ grocery store may be prompted to add "XYZ grocery shopper" as an area of interest in their member profile data, authorize online queries related to shopping at the XYZ grocery store, and authorize promotions related to shopping at the XYZ grocery store. Another user found to be frequently present in at football games may be prompted to add "football fan" as an area of interest in their member profile data, authorize online queries related to football, and authorize promotions related to football. As another option, this may include providing the member with a link to "click through" to an online destination specified by the requester.

In step 121, the situational awareness system receives updated authorizations from the member. In step 122, the situational awareness system updates the member's profile data to reflect the updated authorizations, which typically includes subject matter of interest data identified from analyzing the member's location data, online query authorizations related to those subject matters of interest, and promotions related to those subject matters of interest. Online queries are typically sent to the member's mobile device by text message, while the user may be able to select different modes of communication for promotions, such as text message, email and telephone contact. In step 123, the situational awareness system increases the member's online query priority to reflect that member's expressed interest in participating in online queries relating to the added subject matter of interest. In step 124, the situational awareness system transmits online queries to the member based on the increased query priority, which increases the member's ability to earn compensation by participating in online queries. This improves the efficiency of subsequent online queries by directing queries to those members that have indicated an interest in participating.

As another option, in step 125, the situational awareness system may receive a request for the member's direct contact information from the requester of the situational awareness information. In step 126, the situational awareness system prompts the member to authorize delivery of the member's direct contact information to the requester of the situational awareness information. In step 127, the situational awareness system receives the authorization of the member to deliver the member's direct contact information to the requester of the situational awareness information. In step 128, the situational awareness system delivers the member's direct contact information to the requester of the situational awareness information, such as the member's email address, social media address, or mobile telephone number. This can be particularly useful when requester's objective is to identify members to participate in a telephone interview or other type of direct communication.

FIG. 12 is a conceptual illustration of a menu-driven graphical user interface panel 120 for prompting a member to update their member profile based on monitored location data to increase their online query priority. This allows the member to update their data profile based on an analysis of their location data performed by the situational awareness system. In this particular example, the prompt begins with an informational message, "greetings valued instant response system member. We have noticed that you like to earn income by responding to online queries and have location services turned on to enhance your query priority. Thank you for being such a great member! Did you know that you can increase your query priority and earning potential even more by updating your instant response profile to indicate your areas of interest? it is easy, just click here [link] to go to your profile." The illustrative prompt continues, "we have made updating your profile even easier! We noticed from your location data that you often go to movie theaters. Let us know if you would like to automatically update your instant response profile as show below:". The prompt then provides selection items allowing the member to "update profile to show that I am a movie buff"; "please send me movie related promotions"; and/or "please include my profile data in the anonymous instant response database."

Figure 13:
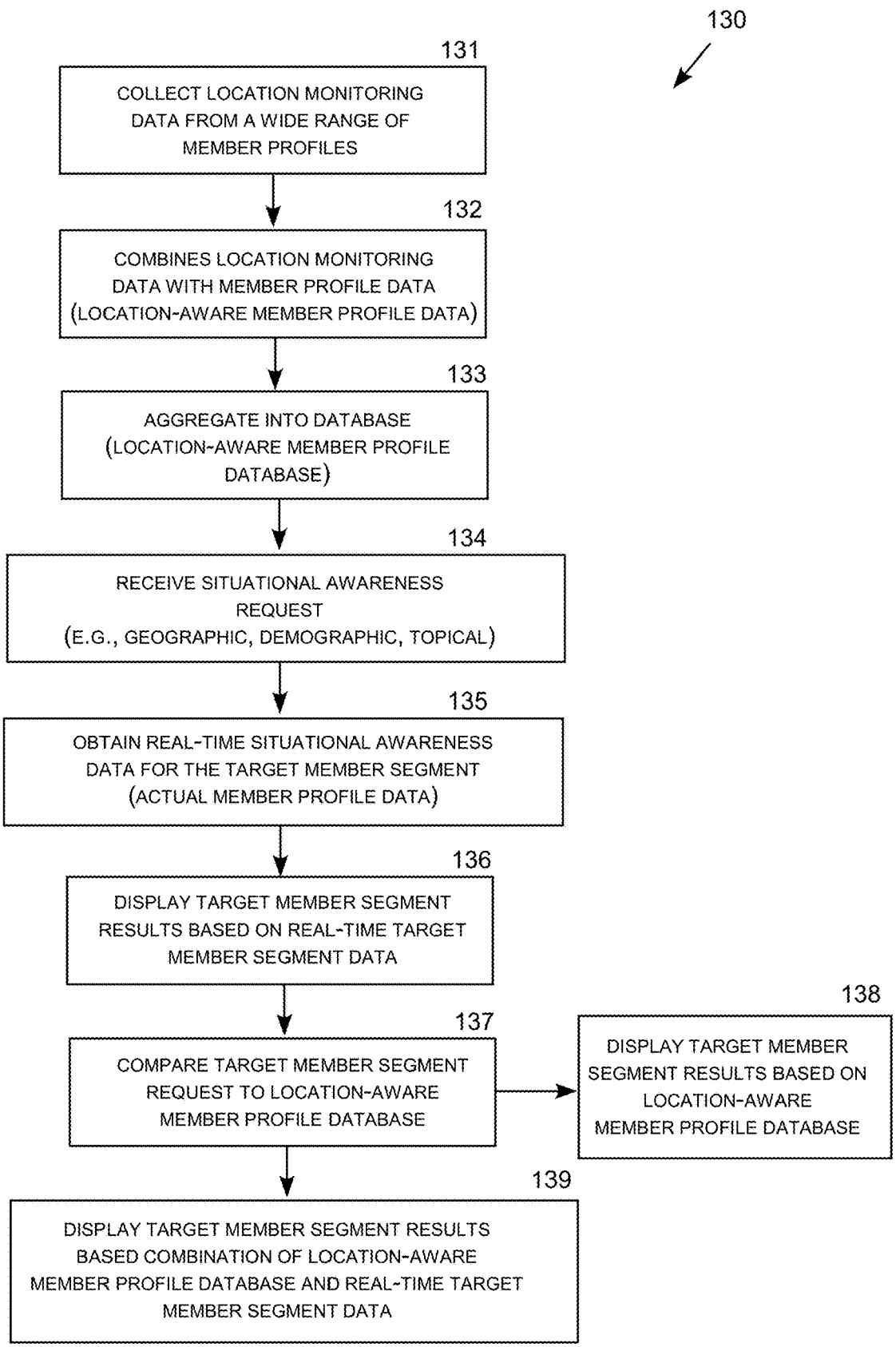
FIG. 13 is a logic flow diagram for creating and using an aggregate location-aware member profile database to provide geographic, personal data and subject matter of interest awareness.

FIG. 13 is a logic flow diagram 130 for creating and using an aggregate location-aware member profile database to provide geographic, personal data and subject matter of interest awareness. In some cases, a requester may be interested in obtaining situational awareness information based on an approximation of the total population in an area. To meet this need, the situational awareness system utilizes a combination of real-time data, stored historical data, and general personal data statistics. In step 131, the situational awareness system collects location monitoring data from a wide range of member profiles. In step 132, the situational awareness system combines location monitoring data with member profile data to create location-aware member profile data. In step 133, the situational awareness system aggregates the location-aware member profile data from a large number of members into a location-aware member profile database, and may scale or otherwise adjust the data to considered representative of the general population. In step 134, the situational awareness system receives a situational awareness request, such as a target member segment request specifying one or more of a geographical area of interest, a personal data profile of interest, and a subject matter area of interest. In step 135, the situational awareness system obtains real-time situational awareness data for the target member segment from member mobile devices that actually correspond to the situational awareness request. In step 136, the situational awareness system displays data representing the target member segment based on the real-time situational awareness data. In step 137, the situational awareness system compares the situational awareness request to the location-aware member profile database to identify corresponding members based on the recorded historical data in the database. In step 138, the situational awareness system displays data representing the target member segment based on the recorded historical data in the location-aware member profile database, which may be adjusted to be considered representative of the general population. In step 139, the situational awareness system displays a combination of the real-time data and the recorded historical data for the target member segment corresponding to the situational awareness request, which may be considered representative of the general population in the geographic area of interest identified in the situational awareness request.

Figure 14:
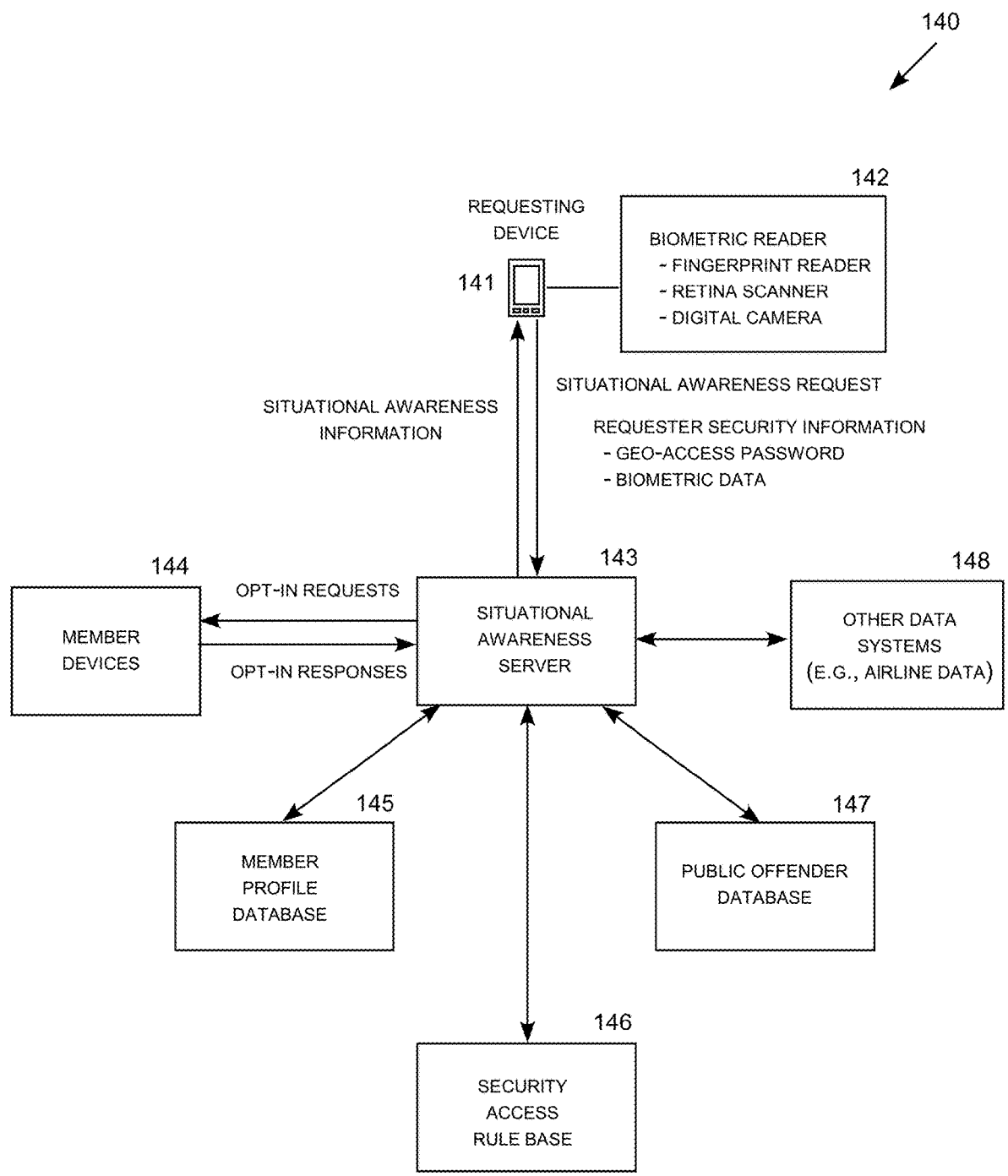
FIG. 14 is a conceptual illustration of a system for providing security when providing access to member profile data.

FIG. 14 is a conceptual illustration of a system 140 for providing security when providing access to member profile data. A requesting device 141, such as a smartphone, may have to provide a geo-access password to submit an acceptable request. For an increased level of security, the requesting device 141 may include a biometric reader 142, such as a fingerprint reader, retina scanner or digital camera, to ensure that the device is being used by a registered member. The requesting device 141 places a situational awareness request to a situational awareness server 143, which responds with situational awareness information provided that applicable security conditions are met. One security conditions may be that a biometric identifier from the biometric reader corresponds to a stored biometric identifier for the requester (e.g., member or customer) associated with the mobile device making the request. The situational awareness server 143 may communicate with member devices corresponding to the situational awareness request, also referred to as the target member segment, as a condition to including a member in the situational awareness information provided to the requester. For a representative member, this typically involves checking the settings for the member in a member profile database 145 to determine whether the member has a setting pre-authorizing the member to be included in the type of situational awareness information requested. For more sophisticated participation rules, rules contained in a security rule base 146 may be applied to the member's profile data to determine whether the member should be included in the situational awareness information. For example, age limits may be applied, security rules may exclude certain requesters from receiving information about certain types of members, and special-purpose rules may be defined to limit situational awareness information to particular groups defined on an as-needed basis. The security clearance process may further include checking the requester against a public offender database 147 and other data systems 148. For example, the data system may be a university enrollment database, where registered students, but not other types of requesters may be permitted to obtain situational awareness information about other university students. This may be a desired feature allowing any type of group to limit information to other group members, such as meet-up groups, church groups, corporate employees, families and the like. As another example, the other date systems 148 may include flight tracking systems operated by airports and airlines allowing the situational awareness system to provide airline traveler tracking, as described with reference to FIGS. 16-18.

Opt-in participation is another example security feature. If participation is not pre-authorized, the situational awareness server 143 may send an opt-in request to the member prompting the member to opt-in to the specific request. The member will be included in the situational awareness information returned to the requester only if the member returns an opt-in response authorizing participation. Sophisticated security rules may be developed and stored in the security rule base 146 covering a wide range of security access rules and situational awareness distribution groups developed by and for members.

Figure 15:
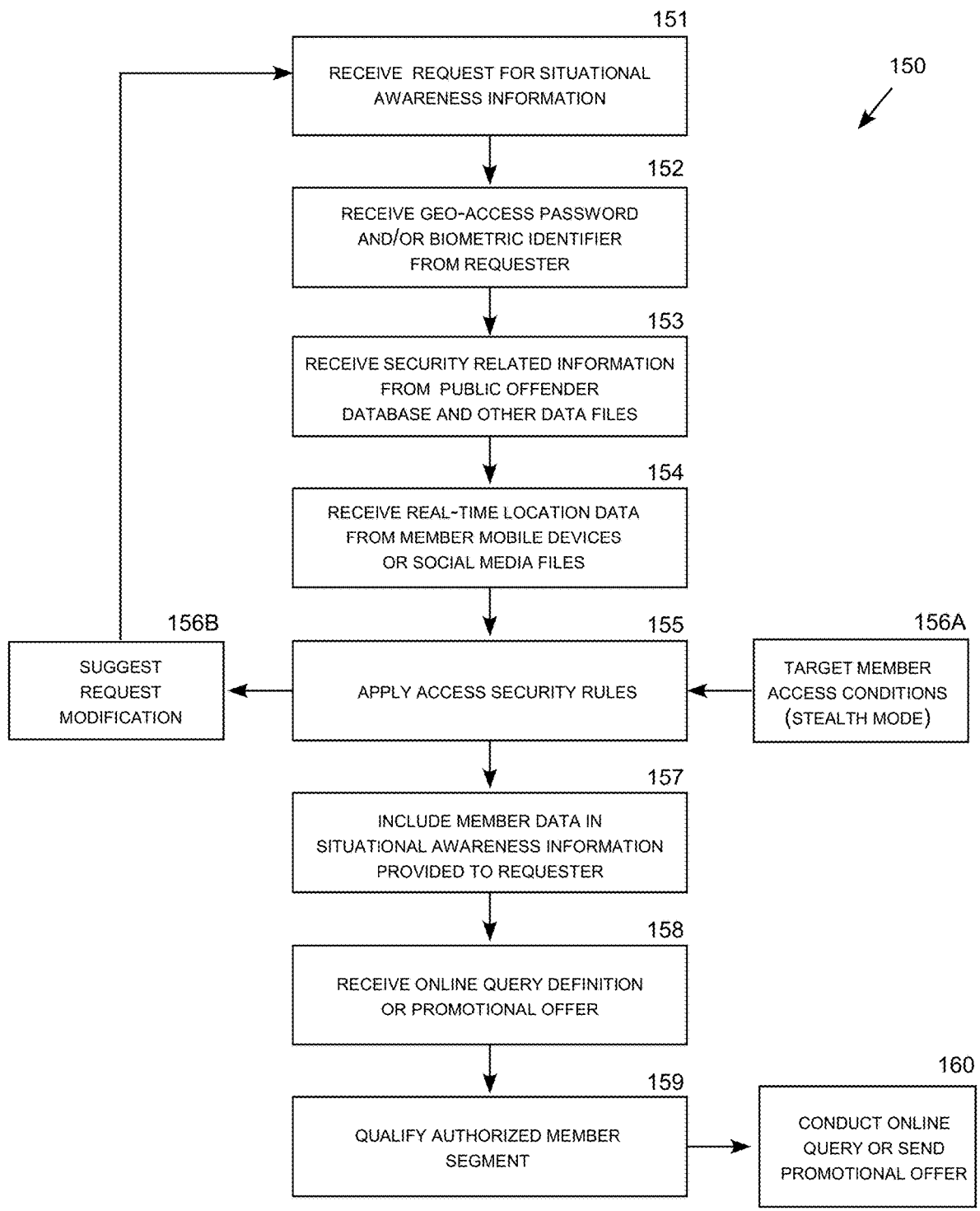
FIG. 15 is a logic flow diagram for providing security when deciding whether to including a member's profile data in situational awareness information provided in response to a situational awareness request.

To provide an illustrative example of the type of security procedures that may be implemented, FIG. 15 is a logic flow diagram 150 for providing security when deciding whether to including a member's profile data in situational awareness information provided in response to a situational awareness request. In step 151, the situational awareness system receives a request for situational awareness information. In step 152, the situational awareness system may receive a geo-access password or biometric identifier to the identity of the requester as a condition to providing situational awareness information to the requester. In step 153, the situational awareness system may receive data from a public offender database to ensure that the requester is not a registered offender as a condition to providing situational awareness information to the requester. The situational awareness system may also receive data from another data system, such as an enrollment database, to ensure that the requester is part of a particular group (e.g., college student body, corporate employee, etc.) as a condition to providing situational awareness information to the requester. In step 154, the situational awareness system receives real-time location data from mobile communication devices associated with system members. Alternatively, one or more of the mobile communication devices may report the location data to an associated social media file, and the situational awareness system may receive the real-time location data from the social media file. In step 155, the situational awareness system may apply one or more access rules from the security rule base 146 to the requester's data profile, the member's data profile, the data received from external data files (e.g., public offender database, enrollment database, etc.), or a combination of these resources as a condition to providing situational awareness information to the requester. In step 156A, the situational awareness system may exclude member data for members who have activated "stealth mode" to opt-out of situational aware participation. In step 156B, the situational awareness system may prompt the requester to modify the request, for example when the size of the target member segment is null or too low. The user may then alter geographic, personal data or subject matter of interest restrictions in an effort to obtain a larger target member segment.

In step 157, if the requester is permitted to receive any situational awareness data, the situational awareness system provides the permitted data in the manner previously described. In step 158, the situational awareness system may receive a requesting to send the target member segment an online query or promotional offer. In step 159, the situational awareness system may apply another selection of security measures to decide whether to authorize the online query or promotional offer. For example, the situational awareness system may check the member profile data for settings pre-authorizing this type of communication, and may also send opt-in requests to members to prompt the members of the target member segment to authorize the online query or promotional offer. In step 160, if the requester is permitted to send the online query or promotional offer to an authorized member segment, the situational awareness system sends the online query or promotional offer in the manner previously described.

Figure 16:
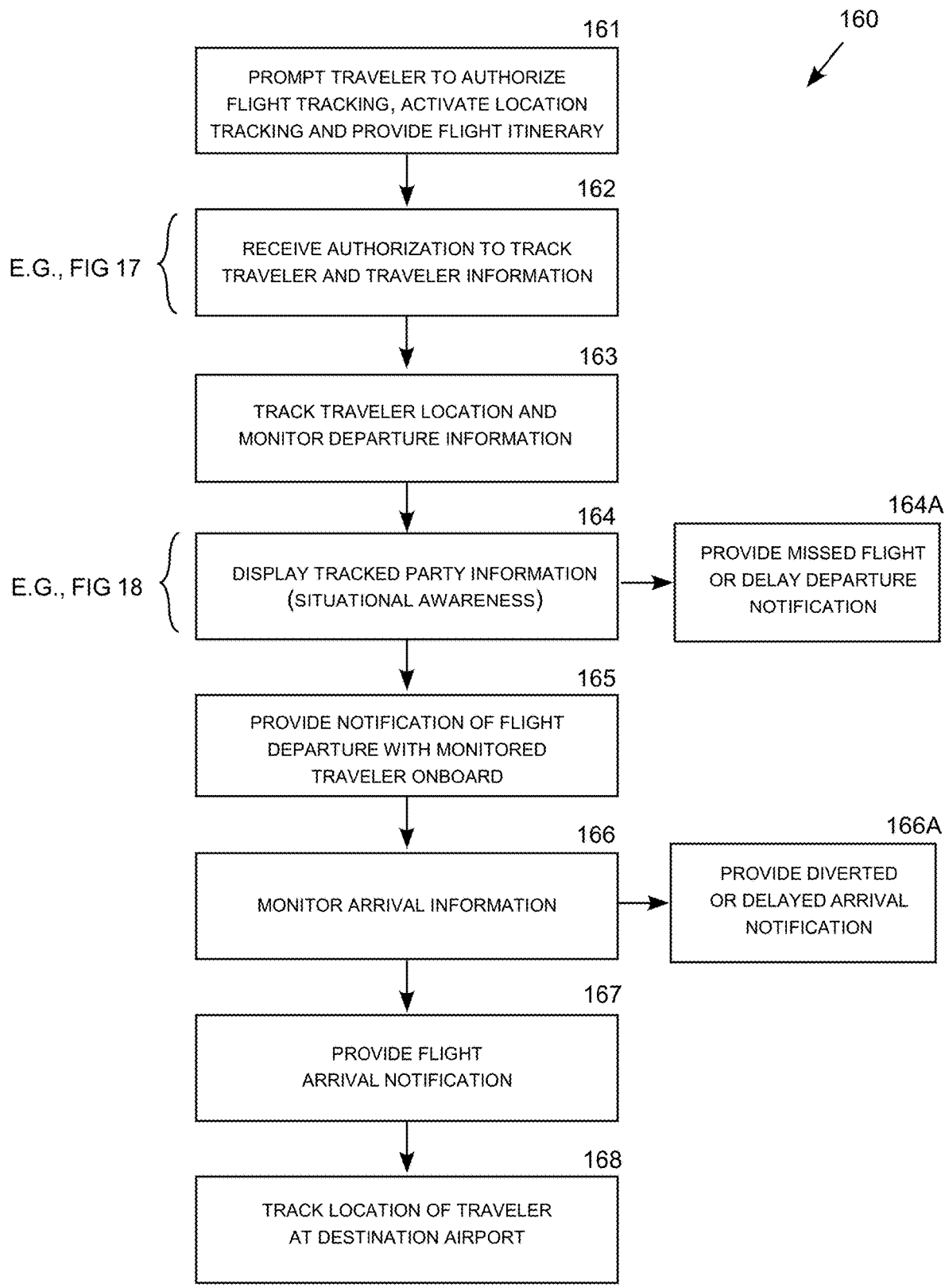
FIG. 16 is a logic flow diagram for utilizing the situational awareness system as an airline traveler tracking system.

FIG. 16 is a logic flow diagram 160 for utilizing the situational awareness system 140 as an airline traveler tracking system. While many other options and features may be included in this application, the following disclosure describes the basic features of the airline traveler tracking system. Referring to FIG. 16 in combination with FIG. 14 showing the system components, in step 161 the situational awareness server 113 prompts a traveler to authorizing flight tracking, activate location tracking, and provide flight itinerary information. To enable flight tracking, location tracking must typically be activated on the mobile device of the person to be tracked. Flight tracking may be turned on manually or automatically upon activation of flight tracking. Flight tracking may be enabled on a "pull model" basis by a traveler who wants to authorize another person to track their airline travel, or on a "push" basis in response to a tracking request by the other party. In either case, the expressed permission of the person to be tracked is typically required unless prior tracking authorization has been provided, for example through parental controls or standing instructions.

In step 162, the situational awareness server 113 receives flight tracking authorization and information used to track the traveler and the traveler's flight. This may be accomplished, for example, by receiving this information through the traveler information user interface screen 170 shown in FIG. 17. In step 163, the situational awareness server 113 tracks the location of the tracked traveler and monitors the departure information of the traveler's flight, for example by consulting other data systems 148 shown in FIG. 14 containing airline schedule and departure information. In step 164, the situational awareness server 113 may provide the tracking party with ongoing tracking information, for example through the user interface shown in FIG. 18. In step 164A, if the monitored location of the traveler and the flight departure information indicate that the traveler was not in the location of the plane at the time of departure, the situational awareness server 113 provides the tracking party with notification that the tracked party missed the flight. The missed flight determination many be confirmed by the tracked party's location continuing to available after flight departure, which typically requires the traveler's phone to be turned off. A properly boarded and departed flight will create a recognizable pattern that should be followed whenever a passenger has boarded a departed flight. Basing the missed flight determination on actual monitored location data and flight departure information, as opposed to scheduled flight information, provides an accurate assessment of missed flights. In the unusual event that the party boards the flight without their mobile device, the missed flight notification will effectively mean that the traveler's mobile device was lost or stolen prior to departure providing a basis for promptly attempting to recover the mobile device.

If the monitored data indicates that the traveler boarded a flight that departed, in step 165 the situational awareness server 113 provides the monitoring party notification that the flight departed with the monitored traveler onboard. In step 166, the situational awareness server 113 monitors the flight arrival information. In step 166A, if the situational awareness server 113 determines that the fight has been diverted or delayed, it provides the monitoring party notification that the flight has been diverted or delayed. In step 167, if the situational awareness server 113 determines that the tracked flight has arrived with the tracked passenger onboard, it provides a flight arrival notification to the tracking party. In step 168, the situational awareness server 113 tracks the location of the tracked passenger at the destination airport, which may aid in passenger pickup. Of course, the arrival and location of the passenger would be tracked at an alternate airport if the flight happened to be diverted from its original destination.

Figures 17, 18:
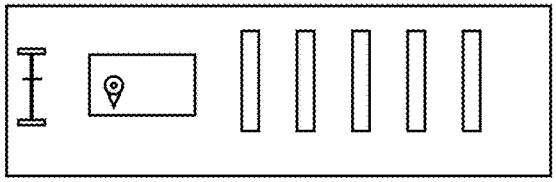
FIG. 17 is a conceptual illustration of a traveler information user interface screen in the airline traveler tracking system.
FIG. 18 is a conceptual illustration of a tracked party information user interface screen in the airline traveler tracking system.

FIG. 17 is a conceptual illustration of a traveler information user interface screen 170 in the airline traveler tracking system. This user interface screen includes a selection item (e.g., check box) where the party to be tracked authorizes location tracking and agrees to the terms of the service. The user may also select an item to read the terms, if desired. The user interface screen 170 also includes a number of selection fields (e.g., semi-structured text input fields) where the party to be tracked enters information for the scheduled flight departure, connections and arrival. Other selection items and fields may be provided as a matter of design choice, such as items and fields for activating notifications, authorizing standing instructions for tracking parties, authorizing tracking parties for specific flights, enabling or disabling post-arrival tracking, providing messages such as pick up instructions to tracking parties, automatically closing flight plans, and so forth.

FIG. 18 is a conceptual illustration of a tracked party information user interface screen 180 in the airline traveler tracking system. This user interface screen includes fields identifying the tracked party, traveler's flight, status, destination, and the tracked party's current location. A map may also be displayed, such as a map of the travel route or airport displaying a marker showing the current location of the passenger or the passenger's flight. Other items or fields may be provided as a matter of design choice, such as the ability to pull up a picture of the tracked passenger, which may be helpful for drivers or other receiving parties meeting persons they have not met before. For military applications, for example, the selection items may be provided for accessing the traveling party's orders, security clearance information, access rights to equipment and facilities, briefing materials, and so forth.

FIG. 19 is a conceptual illustration of a user interface screen 190 for a traveler awareness and communication feature of the situational awareness system 10. The traveler awareness and communication feature differs from the flight tracking feature descried with reference to FIGS. 17 and 18 in that the traveler awareness and communication feature does not require specific flight information provided by specific traveling parties to specific tracking parties prior to tracked flights. Instead, the traveler awareness and communication feature allows a customer to define, track, and direct communications to classes of members who meet specified tracking parameters. While the tracked members will have to authorize tracking generally and may be required to authorize traveler awareness tracking to participate in the program, they will not be required to provide specific flight information to specific tracking parties. This allows product and service providers generally to send messages to classes of travelers meeting the specified characteristic. These messages may include, for example, security advisories, travel advisories, weather advisories, promotional offers, information about local attractions, currency exchange, hotels, restaurants, travel agents, and so forth. The traveler awareness and communication feature is thus designed to allow a wide range of product and service providers to reach out to defined classes of travelers as they arrive at their destinations. The app running on the member device may permit each member to allow or deny these messages on a case-by-case and provider-by-provider basis. Certain types of messages, such as security, travel and weather advisories may be mandatory or require the member to specifically "opt out" to disable. Other types of messages, such as promotional messages, may require the member to "opt in" prior to receiving these types of messages.

The user interface 190 provides an example of the type of interface that requesting parties interested in reaching out to travelers may use to identify and send communications to classes of travelers meeting certain characteristics. In this example, the upper portion of the user interface 190 allows the requesting party to enter an arrival airport and arrival time window along with an optional departure airport and departure time window. The user may also add additional arrival airports and arrival time windows, and additional departure airports and departure time windows, as desired. Upon selection of a "run search" command, the situational awareness server 12 will identify participating members that meet the defined criteria. In particular, the situational awareness server 12 may identify corresponding members by analyzing the location tracking information of participating members and flight information available online to identify those member devices with location patterns consistent with flying on the identified flights. For example, a member traveling from Tampa to Atlanta as illustrated in FIG. 19 can be expected to be located at the Atlanta Airport during the arrival window and at the Tampa Airport during the departure window, and will also have their user device turned off during the associated flight. The situational awareness server 12 may confirm and adjust these parameters based on actual flight information to take account of flight delays, rerouting and so forth.

The lower portion of the user interface 190 allows the requesting customer to enter a message to be delivered to travelers meeting the criteria specified in the upper portion of the user interface. The message is usually delivered by text message, which may be the default setting, although each member may have the ability to set the delivery mode generally of for traveler awareness messages specifically. To accommodate messages that may be sent out on a pay-per-message basis, the lower portion of the user interface 190 also allows the requesting party (in this case a customer of the situational awareness system) to set parameters limiting message distribution. In the example, the requesting party may set a maximum number of messages, an expiration time, and/or a target demographic profile for message recipients. Selecting the "target demographic profile" option may activate another user interface or download a file that allows the requesting party to precisely define the demographic characteristics of message recipients. This feature may utilize demographic information specified by the user as well as information obtained from other sources. For example, messages may only be directed to persons who have stayed at a particular hotel, visited a particular casino, attended a particular sporting event, or belong to a particular club or group. This type of group might include, for example, members of hotel loyalty programs, graduates of a particular university, members of a particular fan club, season ticket holders, persons meeting the characteristics of a convention or other event scheduled in the local area, business travelers, tourist travelers, previous customers of a particular business, and so forth. These are only a few examples of a wide range of criteria that customers may define for pay-per-message access using this feature.

Members who receive responses may take a variety of actions in response to the received messages. Some messages may be passive, such as advertisements, while others may have active components. For example, online queries may accept responses in exchange for per-response compensation. Messages may also include hotlinks to web pages, downloadable files, phone numbers, and other resources. Messages may also prompt the receiving party to send or authorize the situational awareness system to send personal contact information, for example by sending a text or email opening a communication with the sender or another entity identified in a message. These are only a few examples of a wide range of response actions that customers may take in response to messages received through the traveler awareness and communication feature of the situational awareness system.

Figure 20:
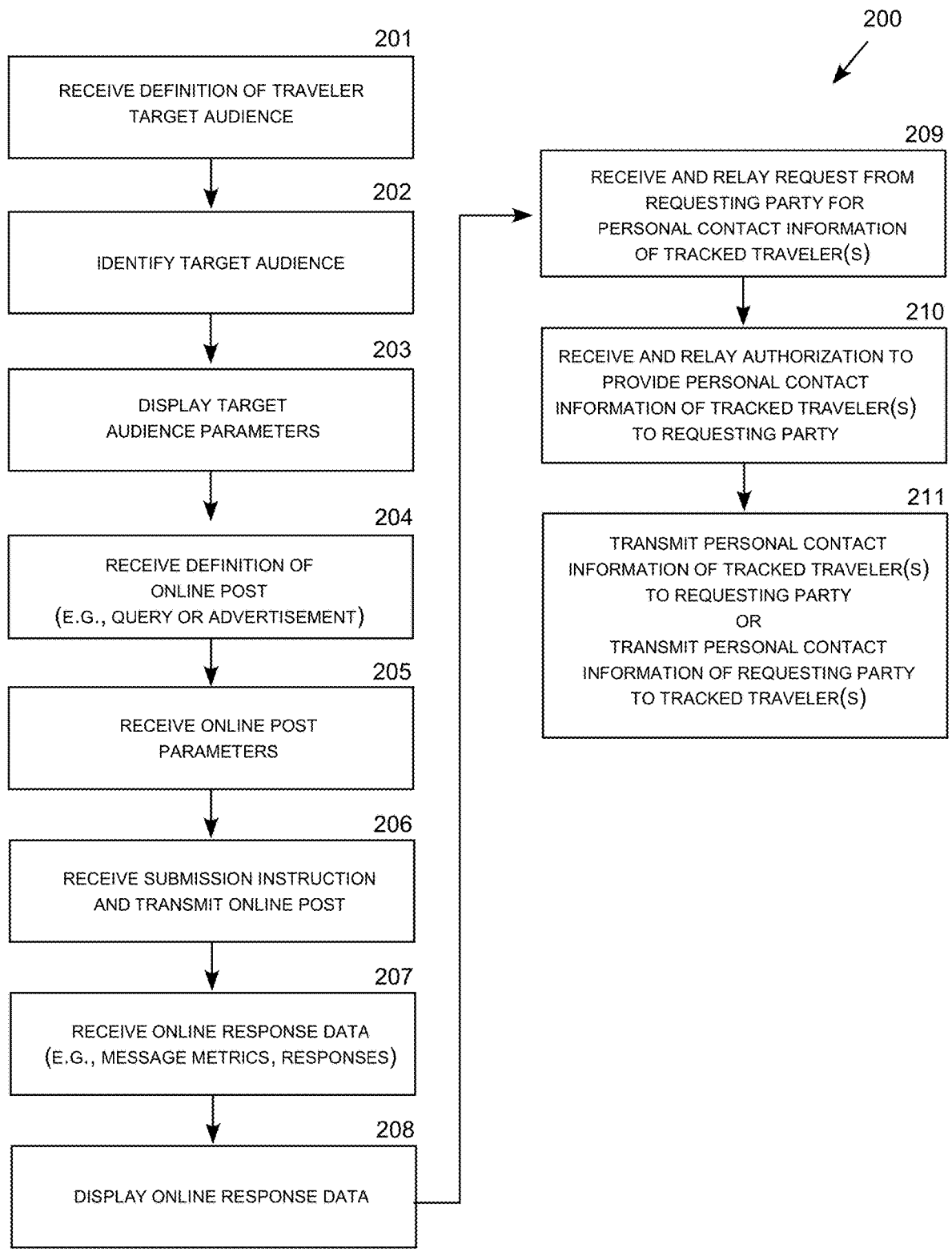
FIG. 20 is a logic flow diagram for the traveler awareness and communication feature of the situational awareness system.

FIG. 20 is a logic flow diagram 200 for the traveler awareness and communication feature of the situational awareness system. In step 201, the situational awareness server 12 receives a definition of target audience. For example, the target audience may be defined using the upper portion of the user interface 190 shown in FIG. 19. Step 201 is followed by step 202, in which the situational awareness server 12 identifies the target audience. This involves analyzing member location data and online flight information to identify participating member that meet the specified criteria. Step 202 is followed by step 203, in which the situational awareness server 12 displays target audience parameters. For example, selection of the "view results" item in the user interface 190 shown in FIG. 19 activates and displays the target audience parameters to assist the user in entering the information. The target audience parameters typically indicate the size and may indicate demographic information about the target audience to help the requesting party decide whether to proceed with sending message to the target audience. At this point, the requesting party may refine the definition of the target audience, and review the results, until they have defined a target audience suitable for the message that they intend to send. This may be an iterative process. It should also be appreciated that providing this level of situational awareness about travelers is a valuable service regardless of whether the requesting party actually sends out a message.

Step 203 is followed by step 204, in which the situational awareness server 12 receives a definition of an online post, such as a query or advertisement, to be sent to the target audience. For example, the online post may be defined using the lower portion of the user interface 190 shown in FIG. 19. Step 204 is followed by step 205, in which the situational awareness server 12 may receive online post parameters to control the distribution of the online post. These parameters may also be entered using the lower portion of the user interface 190 shown in FIG. 19. Step 205 is followed by step 206, in which the situational awareness server 12 receives submission instructions and transmits the online post to participating member devices meeting the specified criteria. Step 206 is followed by step 207, in which the situational awareness server 12 receives online response data, such as message metrics and responses. Step 207 is followed by step 208, in which the situational awareness server 12 causes the requesting customer's device to display the online response data. For example, the response data may be displayed through the user interface displays shown in FIGS. 9 and 10 or other suitable types of displays.

Step 208 is followed by step 209, in which the situational awareness server 12 may receive and relay request from a requesting party for personal contact information of tracked traveler(s). Step 209 is followed by step 210, in which the situational awareness server 12 receives and relays authorization to provide personal contact information of tracked traveler(s) to requesting party. Step 210 is followed by step 211, in which the situational awareness server 12 transmits the personal contact information of tracked traveler(s) to the requesting party or transmits the personal contact information of requesting party to the tracked traveler(s). For example, this may include sending a text or email message to the requesting party opening a line of communication between the responding member and the requesting party.

It will be appreciated that the tracking system described above is not limited to human passengers, but may also be used to track equipment, animals, or any other type of shipped item. It will be further appreciated that the system is not limited to flight tracking, but may also be used to track parties or items traveling by marine vessel, train, truck, automobile, and so forth.

The present disclosure may be implemented on portable computing devices, which may communicate with a server system providing access to a number of client systems over a network, or as a dedicated computing system. As such, embodiments of the disclosure may comprise adapting or reconfiguring presently existing equipment. Alternatively, original equipment may be provided embodying the disclosure.

All of the methods described in this disclosure may include storing results of one or more steps of the method embodiments in a non-transient storage medium. The results may include any of the results described in this disclosure and may be stored in any manner known in the art. The storage medium may include any storage medium described in this disclosure or any other suitable storage medium known in the art. After the results have been stored, the results can be accessed in the storage medium and used by any of the method or system embodiments described in this disclosure, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations.

What is claimed is:

1. A method comprising:
receiving, by a network device comprising a processor, a request for situational awareness data from a requesting mobile device associated with a requester, wherein the situational awareness data comprises a request for direct contact information;
receiving, by the network device, security information pertaining to the requester or the requesting mobile device from one or more sources other than the requesting mobile device;
receiving, by the network device, access security rules;
identifying, by the network device, an authorized mobile communication device that has authorized release of direct contact information in response to the situational awareness request based on the security information pertaining to the requester or the requesting mobile device and the security access rules; and
receiving, by the network device, direct contact information for the authorized mobile communication device; and
sending, by the network device, the direct contact information for the authorized mobile communication device to the requesting mobile device.

2. The method of claim 1, further comprising:
receiving permission data associated with the mobile devices;
identifying, by the network device, a permission qualified authorized mobile communication device that has authorized release of direct contact information in response to the situational awareness request based on the security information pertaining to the requester or the requesting mobile device and the security access rules;
sending, by the network device, the direct contact information for the permission qualified authorized mobile communication device to the requesting mobile device.

3. The method of claim 2, further comprising:
sending, by the network device, an opt-in prompt to the permission qualified authorized mobile communication device;
receiving, by the network device, the permission data associated with the permission qualified authorized mobile communication device in response to the opt-in prompt.

4. The method of claim 1, further comprising:
receiving, by the network device, a geographical area of interest from the requesting mobile device;
receiving, by the network device, geographic location data associated with mobile devices located within the geographic area of interest;
identifying, by the network device, a geographically qualified authorized mobile communication device within the geographic area of interest that has authorized release of direct contact information in response to the situational awareness request based on the permission data, the security information pertaining to the requester or the requesting mobile device and the security access rules;

sending, by the network device, the direct contact information for the geographically qualified authorized mobile communication device to the requesting mobile device.

5. The method of claim 1, further comprising:
receiving, by the network device, a topical area of interest from the requesting mobile device;
receiving, by the network device, topical area of interest data associated with mobile devices;
identifying, by the network device, a topically qualified authorized mobile communication device within the geographic area of interest that has authorized release of direct contact information in response to the situational awareness request based on the topical area of interest data, the security information pertaining to the requester or the requesting mobile device and the security access rules;
sending, by the network device, the direct contact information for the topically qualified authorized mobile communication device to the requesting mobile device.

6. The method of claim 1, wherein the security information comprises verified biometric data, further comprising receiving biometric data from the requesting mobile device and comparing the received biometric data with the verified biometric data.

7. The method of claim 1, wherein the security information comprises verified biometric data, further comprising receiving biometric data from the authorized mobile communication device and comparing the received biometric data with the verified biometric data.

8. A non-transitory computer readable storage medium storing computer-executable instructions that, when executed by a computer system comprising a processor, cause the system to perform operations, comprising:
receiving a request for situational awareness data from a requesting mobile device associated with a requester, wherein the situational awareness data comprises a request for direct contact information;
receiving security information pertaining to the requester or the requesting mobile device from one or more sources other than the requesting mobile device;
receiving access security rules;
identifying an authorized mobile communication device that has authorized release of direct contact information in response to the situational awareness request based on the security information pertaining to the requester or the requesting mobile device and the security access rules;
receiving direct contact information for the authorized mobile communication device; and
sending the direct contact information for the authorized mobile communication device to the requesting mobile device.

9. The computer readable storage medium of claim 8, wherein the operations further comprise:
receiving permission data associated with the mobile devices;
identifying a permission qualified authorized mobile communication device that has authorized release of direct contact information in response to the situational awareness request based on the security information pertaining to the requester or the requesting mobile device and the security access rules; and
sending the direct contact information for the permission qualified authorized mobile communication device to the requesting mobile device.

10. The computer readable storage medium of claim 9, wherein the operations further comprise:
sending an opt-in prompt to the permission qualified authorized mobile communication device; and
receiving the permission data associated with the permission qualified authorized mobile communication device in response to the opt-in prompt.

11. The computer readable storage medium of claim 8, wherein the operations further comprise:
receiving a geographical area of interest from the requesting mobile device;
receiving geographic location data associated with mobile devices located within the geographic area of interest;
identifying a geographically qualified authorized mobile communication device within the geographic area of interest that has authorized release of direct contact information in response to the situational awareness request based on the permission data, the security information pertaining to the requester or the requesting mobile device and the security access rules; and
sending the direct contact information for the geographically qualified authorized mobile communication device to the requesting mobile device.

12. The computer readable storage medium of claim 8, wherein the operations further comprise:
receiving a topical area of interest from the requesting mobile device;
receiving topical area of interest data associated with mobile devices;
identifying a topically qualified authorized mobile communication device within the geographic area of interest that has authorized release of direct contact information in response to the situational awareness request based on the topical area of interest data, the security information pertaining to the requester or the requesting mobile device and the security access rules; and
sending the direct contact information for the topically qualified authorized mobile communication device to the requesting mobile device.

13. The computer readable storage medium of claim 8, wherein the security information comprises information received from a public offender database.

14. The computer readable storage medium of claim 8, wherein the security information comprises information received from an enrollment database.

15. The computer readable storage medium of claim 8, wherein the security information comprises information received from a social media resource.

16. A computer device operably connected to a network configured to perform operations comprising:
receiving a request for situational awareness data from a requesting mobile device associated with a requester, wherein the situational awareness data comprises a request for direct contact information;
receiving security information pertaining to the requester or the requesting mobile device from one or more sources other than the requesting mobile device;
receiving access security rules;
identifying an authorized mobile communication device that has authorized release of direct contact information in response to the situational awareness request based on the security information pertaining to the requester or the requesting mobile device and the security access rules;
receiving direct contact information for the authorized mobile communication device; and sending the direct contact information for the authorized mobile communication device to the requesting mobile device.

17. The computer device of claim 16, further comprising:
receiving permission data associated with the mobile devices;
identifying a permission qualified authorized mobile communication device that has authorized release of direct contact information in response to the situational awareness request based on the security information pertaining to the requester or the requesting mobile device and the security access rules; and
sending the direct contact information for the permission qualified authorized mobile communication device to the requesting mobile device.

18. The computer device of claim 17, further comprising:
sending an opt-in prompt to the permission qualified authorized mobile communication device; and
receiving the permission data associated with the permission qualified authorized mobile communication device in response to the opt-in prompt.

19. The computer device of claim 16, further comprising:
receiving a geographical area of interest from the requesting mobile device;
receiving geographic location data associated with mobile devices located within the geographic area of interest;
identifying a geographically qualified authorized mobile communication device within the geographic area of interest that has authorized release of direct contact information in response to the situational awareness request based on the permission data, the security information pertaining to the requester or the requesting mobile device and the security access rules; and
sending the direct contact information for the geographically qualified authorized mobile communication device to the requesting mobile device.

20. The computer device of claim 19, further comprising:
receiving a topical area of interest from the requesting mobile device;
receiving, by the network device, topical area of interest data associated with mobile devices;
identifying a topically qualified authorized mobile communication device within the geographic area of interest that has authorized release of direct contact information in response to the situational awareness request based on the topical area of interest data, the security information pertaining to the requester or the requesting mobile device and the security access rules; and
sending the direct contact information for the topically qualified authorized mobile communication device to the requesting mobile device.

\* \* \* \* \*